United States Patent
Sargent et al.

(10) Patent No.: US 6,758,130 B2
(45) Date of Patent: Jul. 6, 2004

(54) BEVERAGE BREWING DEVICES FOR PREPARING CREAMY BEVERAGES

(75) Inventors: Jeffrey Alan Sargent, West Chester, OH (US); Francisco Valentino Villagran, Mason, OH (US)

(73) Assignee: The Procter + Gamble Co., Cincinnati, OH (US)

( * ) Notice: Subject to any disclaimer, the term of this patent is extended or adjusted under 35 U.S.C. 154(b) by 0 days.

(21) Appl. No.: 10/099,085

(22) Filed: Mar. 15, 2002

(65) Prior Publication Data

US 2003/0005826 A1 Jan. 9, 2003

Related U.S. Application Data

(60) Provisional application No. 60/276,361, filed on Mar. 16, 2001, and provisional application No. 60/276,707, filed on Mar. 16, 2001.

(51) Int. Cl.[7] ............................ A47J 31/00; B65B 29/02
(52) U.S. Cl. ............................ 99/295; 99/323; 426/79; 426/78; 426/115
(58) Field of Search .................. 99/295, 323, 323.3, 99/316, 317, 279, 304, 306; 426/77, 78, 79, 112, 115

(56) References Cited

U.S. PATENT DOCUMENTS

| | | |
|---|---|---|
| 1,903,362 A | 4/1933 | McKinnie |
| 2,027,272 A | 1/1936 | Flood |
| 2,377,118 A | 5/1945 | Weisman |
| 2,469,553 A | 5/1949 | Hall |
| 2,531,594 A | 11/1950 | Abrahams |
| 2,750,998 A | 6/1956 | Moore |
| 2,771,343 A | 11/1956 | Arnold et al. |
| 2,968,560 A | 1/1961 | Goros |
| 3,083,100 A | 3/1963 | Baran |
| 3,083,101 A | 3/1963 | Noury |
| 3,183,096 A | 5/1965 | Hiscock |
| 3,309,980 A | 3/1967 | Bozek |
| 3,320,073 A | 5/1967 | Bixby, Jr. et al. |
| 3,344,734 A | 10/1967 | Aguirre-Batres et al. |
| 3,347,151 A | 10/1967 | Ronalds |
| 3,372,634 A | 3/1968 | Brinkman et al. |
| 3,386,834 A | 6/1968 | Noiset et al. |

(List continued on next page.)

FOREIGN PATENT DOCUMENTS

| | | |
|---|---|---|
| DE | 27 37 042 A1 | 2/1979 |
| DE | 37 22 554 C1 | 12/1988 |

(List continued on next page.)

OTHER PUBLICATIONS

Fellows—Food Processing Technology, Chapter 14–Extrusion, pp. 294–308; Chapter 17–Frying, pp. 355–362; and Chapter 20–Controlled–or Modified–Atmosphere Storage and Packaging, pp. 406–417.

(List continued on next page.)

*Primary Examiner*—Reginald L. Alexander
(74) *Attorney, Agent, or Firm*—S. Robert Chuey; Erich D. Hemm

(57) ABSTRACT

The present disclosure relates to beverage brewing devices which are useful for facilitating fluidization and flavor extraction in beverage brewing devices. In particular, the present invention includes a number of embodiments, including beverage brewing devices comprising one or more extraction chambers. The beverage brewing devices are useful for facilitating fluidizing brewing process such that all ingredients contained within the brewing device are accessed in the brewing process. Additionally, desirable properties of brewed beverages are attained without using separate and/or mechanical means. As an additional advantage, the cleaning processes typically required subsequent to preparation of beverages, and in particular the foamed beverages of the present invention, is diminished or avoided.

21 Claims, 15 Drawing Sheets

U.S. PATENT DOCUMENTS

| | | |
|---|---|---|
| 3,387,553 A | 6/1968 | Tavera |
| 3,420,675 A | 1/1969 | Costas |
| 3,436,227 A | 4/1969 | Bergeron et al. |
| 3,493,388 A | 2/1970 | Hair |
| 3,511,166 A | 5/1970 | Bixby, Jr. |
| 3,511,666 A | 5/1970 | Hudson et al. |
| 3,561,349 A | 2/1971 | Endo et al. |
| 3,610,132 A | 10/1971 | Martin et al. |
| 3,610,540 A | 10/1971 | Krolopp et al. |
| 3,615,667 A | 10/1971 | Joffe |
| 3,615,669 A | 10/1971 | Hair et al. |
| 3,620,756 A | 11/1971 | Strobel et al. |
| 3,652,293 A | 3/1972 | Lombana et al. |
| 3,660,106 A | 5/1972 | McSwiggin et al. |
| 3,713,842 A | 1/1973 | Lubsen et al. |
| 3,719,505 A | 3/1973 | Mazza |
| 3,762,930 A | 10/1973 | Mahlmann |
| 3,800,690 A | 4/1974 | Molenaar et al. |
| 3,823,656 A | 7/1974 | Vander Veken |
| 3,861,285 A | 1/1975 | Martin |
| 3,869,555 A * | 3/1975 | Heonis ........................ 426/79 |
| 3,937,134 A | 2/1976 | Molenaar et al. |
| 3,964,175 A | 6/1976 | Sivetz |
| 3,971,305 A | 7/1976 | Daswick |
| 3,975,996 A | 8/1976 | Vitous |
| 4,029,003 A | 6/1977 | Manaresi |
| 4,069,751 A | 1/1978 | Gronwick et al. |
| 4,083,295 A | 4/1978 | Hollingsworth |
| 4,110,485 A | 8/1978 | Grubbs et al. |
| 4,158,329 A | 6/1979 | McKnight |
| 4,162,054 A | 7/1979 | Häuslein |
| 4,164,964 A | 8/1979 | Daniels |
| 4,167,899 A | 9/1979 | McCormick |
| 4,188,409 A | 2/1980 | Kay |
| 4,204,966 A | 5/1980 | Morgan, Jr. |
| 4,220,259 A | 9/1980 | Lagneaux |
| 4,224,168 A | 9/1980 | Trägårdh |
| 4,253,385 A | 3/1981 | Illy |
| 4,254,694 A | 3/1981 | Illy |
| 4,256,030 A | 3/1981 | De Bruin et al. |
| 4,267,200 A | 5/1981 | Klien et al. |
| 4,300,442 A | 11/1981 | Martin |
| 4,328,740 A | 5/1982 | McDonough et al. |
| 4,331,696 A | 5/1982 | Bruce, III |
| 4,338,346 A | 7/1982 | Brand |
| 4,353,293 A | 10/1982 | Illy |
| 4,382,402 A | 5/1983 | Alvarez |
| 4,389,925 A | 6/1983 | Piana |
| 4,399,163 A | 8/1983 | Brennan et al. |
| 4,404,787 A | 9/1983 | Hazelwood |
| 4,410,550 A | 10/1983 | Gaskill |
| 4,411,925 A | 10/1983 | Brennan et al. |
| 4,417,504 A | 11/1983 | Yamamoto |
| 4,423,029 A | 12/1983 | Rizzi |
| 4,428,535 A | 1/1984 | Venetucci |
| 4,429,623 A | 2/1984 | Illy |
| 4,437,294 A | 3/1984 | Romagnoli |
| 4,438,147 A | 3/1984 | Hedrick, Jr. |
| 4,446,158 A | 5/1984 | English et al. |
| 4,484,064 A | 11/1984 | Murray |
| 4,484,515 A | 11/1984 | Illy |
| 4,487,114 A | 12/1984 | Abdenour |
| 4,501,761 A | 2/1985 | Mahlmann et al. |
| 4,519,911 A | 5/1985 | Shimizu |
| 4,540,591 A | 9/1985 | Dar et al. |
| 4,550,024 A | 10/1985 | Le Granse |
| 4,550,027 A | 10/1985 | Stone, Jr. |
| 4,555,894 A | 12/1985 | Illy |
| 4,560,475 A | 12/1985 | Kataoka |
| 4,581,239 A | 4/1986 | Woolman et al. |
| 4,602,558 A | 7/1986 | Kaper et al. |
| 4,620,953 A | 11/1986 | Silla et al. |
| D287,029 S | 12/1986 | Oakley et al. |
| 4,644,855 A | 2/1987 | Woolman et al. |
| D288,886 S | 3/1987 | Oakley et al. |
| 4,646,510 A | 3/1987 | McIntyre |
| 4,683,666 A | 8/1987 | Igusa et al. |
| 4,715,274 A | 12/1987 | Paoletti |
| 4,724,752 A | 2/1988 | Aliesch et al. |
| 4,735,133 A | 4/1988 | Paoletti |
| 4,738,378 A | 4/1988 | Oakley et al. |
| 4,747,250 A | 5/1988 | Rossi |
| 4,765,896 A | 8/1988 | Hartley et al. |
| 4,775,048 A | 10/1988 | Baecchi et al. |
| 4,779,519 A | 10/1988 | Giuliano |
| 4,801,464 A | 1/1989 | Hubbard, Jr. |
| 4,802,406 A | 2/1989 | Bouldin |
| 4,809,594 A | 3/1989 | Vitous |
| 4,815,633 A | 3/1989 | Kondo et al. |
| 4,818,544 A | 4/1989 | Seward |
| 4,826,695 A * | 5/1989 | Tanner ........................ 426/77 |
| 4,828,850 A | 5/1989 | Davis |
| 4,830,869 A | 5/1989 | Wimmers et al. |
| 4,846,052 A | 7/1989 | Favre et al. |
| 4,852,333 A | 8/1989 | Illy |
| 4,852,473 A | 8/1989 | Azpitarte Bolivar |
| 4,852,474 A | 8/1989 | Mahlich et al. |
| 4,853,234 A | 8/1989 | Bentley et al. |
| 4,859,337 A | 8/1989 | Woltermann |
| 4,860,645 A | 8/1989 | van der Lijn et al. |
| 4,863,601 A | 9/1989 | Wittekind et al. |
| 4,867,993 A | 9/1989 | Nordskog |
| 4,870,808 A | 10/1989 | Romagnoli |
| 4,873,915 A | 10/1989 | Newman et al. |
| 4,880,651 A | 11/1989 | Christie |
| 4,886,674 A | 12/1989 | Seward et al. |
| 4,903,585 A | 2/1990 | Wimmers et al. |
| 4,909,136 A | 3/1990 | Newman et al. |
| 4,911,067 A | 3/1990 | Oppermann |
| 4,913,916 A | 4/1990 | Tanner |
| 4,919,962 A | 4/1990 | Arora et al. |
| 4,920,870 A | 5/1990 | Newman et al. |
| 4,921,640 A | 5/1990 | Wu |
| 4,921,712 A | 5/1990 | Malmquist |
| 4,922,810 A | 5/1990 | Siccardi |
| 4,948,018 A | 8/1990 | Tansley et al. |
| 4,959,947 A | 10/1990 | Reif |
| 4,960,042 A | 10/1990 | Grossi |
| 4,966,070 A | 10/1990 | Frisch |
| 4,975,292 A | 12/1990 | Loizzi |
| 4,975,296 A | 12/1990 | Newman et al. |
| 4,975,559 A | 12/1990 | Frisch |
| 4,977,820 A | 12/1990 | Lin |
| 4,983,410 A | 1/1991 | Dinos |
| 4,986,455 A | 1/1991 | Rambold |
| 4,988,590 A | 1/1991 | Price et al. |
| 4,990,352 A | 2/1991 | Newman et al. |
| 4,995,310 A | 2/1991 | Van der Lijn et al. |
| 4,995,978 A | 2/1991 | Van de Gang |
| 4,996,066 A | 2/1991 | Love et al. |
| 5,012,629 A | 5/1991 | Rehman et al. |
| 5,019,413 A | 5/1991 | Becker et al. |
| 5,025,714 A | 6/1991 | Brewer |
| 5,028,328 A | 7/1991 | Long |
| 5,036,755 A | 8/1991 | Abdenour |
| D320,529 S | 10/1991 | Newman et al. |
| D320,530 S | 10/1991 | Newman et al. |
| 5,052,289 A | 10/1991 | De Girolamo |
| 5,055,311 A | 10/1991 | Brauer, Jr. et al. |
| 5,068,979 A | 12/1991 | Wireman et al. |
| 5,072,660 A | 12/1991 | Helbling |

| | | |
|---|---|---|
| 5,072,661 A | 12/1991 | Kondo |
| 5,082,676 A | 1/1992 | Love et al. |
| 5,083,503 A | 1/1992 | van Hattem et al. |
| 5,083,504 A | 1/1992 | Koga et al. |
| 5,104,666 A | 4/1992 | Sanvitale |
| 5,108,768 A | 4/1992 | So |
| 5,111,740 A | 5/1992 | Klein |
| 5,113,752 A | 5/1992 | Brewer |
| 5,123,335 A | 6/1992 | Aselu |
| 5,132,124 A | 7/1992 | Tamaki et al. |
| 5,134,924 A | 8/1992 | Vicker |
| 5,155,923 A | 10/1992 | Wireman et al. |
| 5,158,793 A | 10/1992 | Helbling |
| 5,160,757 A | 11/1992 | Kirkpatrick et al. |
| 5,178,058 A | 1/1993 | van Dort et al. |
| 5,185,171 A | 2/1993 | Bersten |
| 5,189,949 A | 3/1993 | Apa |
| 5,190,652 A | 3/1993 | van Thoor et al. |
| 5,197,374 A | 3/1993 | Fond |
| 5,211,104 A | 5/1993 | Arpin |
| 5,233,915 A | 8/1993 | Siccardi |
| 5,240,722 A | 8/1993 | Louridas |
| 5,242,702 A | 9/1993 | Fond |
| 5,249,509 A | 10/1993 | English |
| 5,265,520 A | 11/1993 | Giuliano |
| 5,272,960 A | 12/1993 | Kinna |
| 5,287,797 A | 2/1994 | Grykiewicz et al. |
| 5,295,431 A | 3/1994 | Schiettecatte et al. |
| 5,298,267 A | 3/1994 | Gruenbacher |
| 5,300,308 A | 4/1994 | Louridas |
| 5,304,305 A | 4/1994 | Lehrer |
| 5,325,765 A | 7/1994 | Sylvan et al. |
| 5,330,266 A | 7/1994 | Stubaus |
| 5,335,588 A | 8/1994 | Mahlich |
| 5,339,725 A | 8/1994 | De'Longhi |
| 5,347,916 A | 9/1994 | Fond et al. |
| 5,398,595 A | 3/1995 | Fond et al. |
| 5,402,707 A | 4/1995 | Fond et al. |
| 5,403,605 A | 4/1995 | Smith et al. |
| 5,423,245 A | 6/1995 | Midden |
| 5,424,083 A | 6/1995 | Lozito |
| 5,462,759 A | 10/1995 | Westerbeek et al. |
| 5,464,574 A | 11/1995 | Mahlich |
| 5,465,649 A | 11/1995 | Muis |
| 5,472,719 A | 12/1995 | Favre |
| 5,473,973 A | 12/1995 | Cortese |
| 5,479,848 A | 1/1996 | Versini |
| 5,490,447 A | 2/1996 | Giuliano |
| 5,490,448 A | 2/1996 | Weller et al. |
| 5,498,757 A | 3/1996 | Johnson et al. |
| 5,509,349 A | 4/1996 | Anderson et al. |
| 5,531,152 A | 7/1996 | Gardosi |
| 5,554,400 A | 9/1996 | Stipp |
| 5,567,461 A | 10/1996 | Lehrer |
| 5,584,229 A | 12/1996 | Anson |
| 5,603,254 A | 2/1997 | Fond et al. |
| 5,605,710 A | 2/1997 | Pridonoff et al. |
| 5,611,262 A | 3/1997 | Rizzuto et al. |
| 5,637,335 A * | 6/1997 | Fond et al. ............... 426/77 X |
| 5,656,311 A | 8/1997 | Fond |
| 5,806,408 A | 9/1998 | DeBacker et al. |
| 5,826,492 A | 10/1998 | Fond et al. |
| 5,840,189 A | 11/1998 | Sylvan et al. |
| D401,803 S | 12/1998 | Alferink |
| 5,855,161 A | 1/1999 | Cortese |
| 5,858,437 A | 1/1999 | Anson |
| 5,862,740 A | 1/1999 | Grossi |
| 5,885,633 A | 3/1999 | Lehrer |
| D408,679 S | 4/1999 | Potts et al. |
| 5,896,806 A | 4/1999 | Dal Tio |
| 5,897,899 A | 4/1999 | Fond |
| 5,899,137 A | 5/1999 | Miller et al. |
| 5,901,634 A | 5/1999 | Vancamp et al. |
| 5,931,080 A | 8/1999 | Roure Boada |
| 5,952,032 A | 9/1999 | Mordini et al. |
| 5,958,478 A | 9/1999 | Lehrer |
| 5,967,019 A | 10/1999 | Johnson et al. |
| 5,997,936 A | 12/1999 | Jimenez-Laguna |
| 6,006,654 A | 12/1999 | Pugh |
| RE36,516 E | 1/2000 | Lehrer |
| 6,009,792 A | 1/2000 | Kraan |
| 6,019,032 A | 2/2000 | Arksey |
| 6,021,705 A | 2/2000 | Dijs |
| 6,024,996 A | 2/2000 | Kaper et al. |
| 6,036,984 A | 3/2000 | Sartorio et al. |
| 6,048,567 A | 4/2000 | Villagran et al. |
| 6,068,871 A | 5/2000 | Fond et al. |
| 6,079,315 A | 6/2000 | Beaulieu et al. |
| 6,082,247 A | 7/2000 | Beaulieu |
| 6,098,524 A | 8/2000 | Reese |
| 6,099,878 A | 8/2000 | Arksey |
| 6,117,471 A | 9/2000 | King |
| 6,119,582 A | 9/2000 | Akkerman-Theunisse et al. |
| 6,142,063 A | 11/2000 | Beaulieu et al. |
| 6,158,328 A | 12/2000 | Cai |
| 6,186,051 B1 | 2/2001 | Aarts |
| 6,490,966 B2 | 12/2002 | Mariller et al. |

FOREIGN PATENT DOCUMENTS

| | | |
|---|---|---|
| DE | 42 34 895 C1 | 3/1994 |
| EP | 0 168 112 A2 | 1/1986 |
| EP | 0 272 922 A2 | 6/1988 |
| EP | 0 340 035 A2 | 11/1989 |
| EP | 0 389 141 A1 | 9/1990 |
| EP | 0 449 533 A1 | 10/1991 |
| EP | 0 451 980 A2 | 10/1991 |
| EP | 0 455 337 A1 | 11/1991 |
| EP | 0 638 486 A1 | 2/1995 |
| EP | 0 749 713 B1 | 12/1996 |
| EP | 0 756 844 B1 | 2/1997 |
| EP | 0 806 167 A1 | 11/1997 |
| EP | 0 806 168 A1 | 11/1997 |
| EP | 0 806 903 B1 | 11/1997 |
| EP | 0 904 717 B1 | 3/1999 |
| EP | 1 089 240 A2 | 4/2001 |
| EP | 1 101 430 A1 | 5/2001 |
| FR | 2 190 372 | 2/1974 |
| FR | 2 617 389 | 1/1989 |
| GB | 1427375 | 3/1976 |
| GB | 2023086 A | 12/1979 |
| GB | 1564094 | 4/1980 |
| GB | 2183459 A | 6/1987 |
| SE | 406265 | 2/1979 |
| WO | WO 97/39668 | 10/1997 |
| WO | WO 99/03753 | 1/1999 |
| WO | WO 99/11167 | 3/1999 |
| WO | WO 00/42891 | 7/2000 |
| WO | WO 00/51478 | 9/2000 |
| WO | WO 01/58786 A1 | 8/2001 |
| WO | WO 01/60219 A1 | 8/2001 |
| WO | WO 01/60220 A1 | 8/2001 |
| WO | WO 01/60712 A1 | 8/2001 |

OTHER PUBLICATIONS

Sivetz & Foote, Coffee Processing Technology, vol. 1, pp. 382–513, Avi Publishing Co. (1963).

Kirk Othmer Encyclopedia of Chemical Technology, Synthetic and Imitation Dairy Products, W.J. Harper, Willey Interscience, vol. 22, $3^{rd}$ Ed. (1978), pp. 465–498.

* cited by examiner

BEVERAGE BREWING DEVICES FOR PREPARING CREAMY BEVERAGES

CROSS REFERENCE TO RELATED APPLICATIONS

This application claims priority to U.S. Provisional Application No. 60/276,361, filed Mar. 16, 2001 and U.S. Provisional Application No. 60/276,707, filed Mar. 16, 2001.

FIELD OF THE INVENTION

The present invention relates to devices for preparing brewed beverage compositions. In particular, the present invention relates to novel processes for preparing brewed beverage compositions.

BACKGROUND OF THE INVENTION

Brewed beverages such as coffees, teas, and cocoas, are widely consumed. In recent years, demand for enhanced quality of these beverages has dramatically increased, as well as the popularity of cafés and coffee houses that utilize high quality ingredients and complex equipment to produce a variety of different beverages. Additionally, beverages having creamy, sweet, or other flavor enhancing characteristics, and/or foam on the surface of the beverage, have gained tremendous popularity, particularly in the field of cappuccinos, espressos, and flavored beverages.

However, traditional techniques for providing creamy or sweetened beverages, or beverages having some other flavor enhancing characteristic, require time-consuming and often expensive steps. Accordingly, even though a consumer may prefer a beverage having a special flavor, the consumer may be less likely to prepare such a beverage given the work, ingredients, or equipment required. This problem is particularly exacerbated for those consumers desiring such a beverage in the home environment.

Additionally, foaming techniques often require complex, time-consuming, and/or equipment-dependent steps, for example, the use of expensive mechanical devices that create steam or whipped creamy ingredients. For example, preparation of foamed beverages requires a user to clean the filter, pot, and cream steamer after each use. This is a particular disadvantage for the at-home consumer who desires a single serving of a café quality beverage which is quickly and easily prepared, without the need for cleaning and preparing the beverage brewer for its next use.

Various single-use brewing units have been proposed in the art, particularly for simplification of the brewing process. For example, EP 0.756,844, to Gotham et al., published Feb. 5, 1997 describes a cappuccino brewing kit in which two filter pouches are utilized in conventional electric espresso machines. One filter pouch contains roast and ground coffee, and the other filter pouch contains a creamer. Indeed, the document states that an important aspect of the cappuccino brewing kit is that it maintains a separation between the roast ground coffee and the creamer, which separation assures that the creamer can wet and dissolve without blocking the passage of water through the brewing kit.

Additionally, there has been minimal focus on the preparation of foamed beverages without the use of mechanical means, particularly in the field of single-use beverage brewing devices. Problems inherent in providing such kits include the creation of foam within these devices, with inefficient delivery of such foam to the final brewed beverage.

It is therefore recognized that there are significant problems related to providing such beverage brewing units in order to provide a high quality brewed beverage. The present inventors have discovered easy to use beverage brewing devices, which may be used with low pressure, convenient brewing systems, and which overcome the foregoing problems. Various embodiments of the invention are provided which facilitate fluidization during the brewing process, as well as inhibition of channeling and adsorption of ingredients on, for example, roast ground coffee particles. Additionally, the present beverage brewing devices facilitate preparation of a foamed beverage by chemical means, which is particularly desirable for consumers preparing such beverages at home. In particular, the brewing devices do not require the use of traditional mechanical systems to generate the foam. Accordingly, therefore, the present inventors describe herein beverage brewing devices which overcome the foregoing problems and may be utilized to provide a high quality beverage with ease of preparation.

SUMMARY OF THE INVENTION

The present invention relates to beverage brewing devices which are useful for facilitating fluidized beverage brewing. In particular, the present invention includes a number of embodiments, including beverage brewing devices comprising one or more ingredient extraction chambers, wherein at least one of the ingredient extraction chambers comprises a composition comprising:

a) a first component selected from the group consisting of roast ground coffee, leaf tea, and mixtures thereof; and b) a second component selected from the group consisting of instant coffee, instant tea, cocoa, and mixtures thereof;

wherein the ratio of the first component to the second component is from about 4:1 to about 25:1, by weight.

In a further embodiment of the present invention, beverage brewing devices are described which comprise one or more ingredient extraction chambers wherein at least one of the ingredient extraction chambers contains a composition comprising:

a) a first component selected from the group consisting of roast ground coffee, leaf tea, and mixtures thereof;

b) a second component selected from the group consisting of instant coffee, instant tea, cocoa, and mixtures thereof; and c) a third component selected from the group consisting of creamers, sweeteners, flavorings, thickening agents, edible carriers, dyes, foaming agents, buffers, emulsifiers, processing aids, and mixtures thereof;

wherein the ratio of the first component to the second component is from about 1:25 to about 25:1, by weight.

In yet a further embodiment of the present invention, beverage brewing devices are described which comprise one or more ingredient extraction chambers wherein at least one of the ingredient extraction chambers comprises a composition comprising:

a) a first component selected from the group consisting of roast ground coffee, leaf tea, instant coffee, instant tea, cocoa, and mixtures thereof; and b) a second component which is a foaming component.

In yet a further embodiment of the present invention, beverage brewing devices are described which comprise one or more ingredient extraction chambers wherein at least one of the ingredient extraction chambers comprises a composition comprising:

a) a first component selected from the group consisting of roast ground coffee, leaf tea, instant coffee, instant tea, cocoa, and mixtures thereof; and b) a second component which comprises three or more members selected from the group consisting of creamers, sweeteners, flavorings, thickening agents, edible carriers, dyes, foaming agents, buffers, emulsifiers, and processing aids.

The beverage brewing devices are useful for facilitating fluidizing brewing process such that all ingredients contained within the brewing device are accessed in the brewing process. Additionally, desirable properties of brewed beverages are attained without using separate and/or mechanical means. As an additional advantage, the cleaning processes typically required subsequent to preparation of beverages, and in particular the foamed beverages of the present invention, is diminished or avoided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE INVENTION

Figure 1:
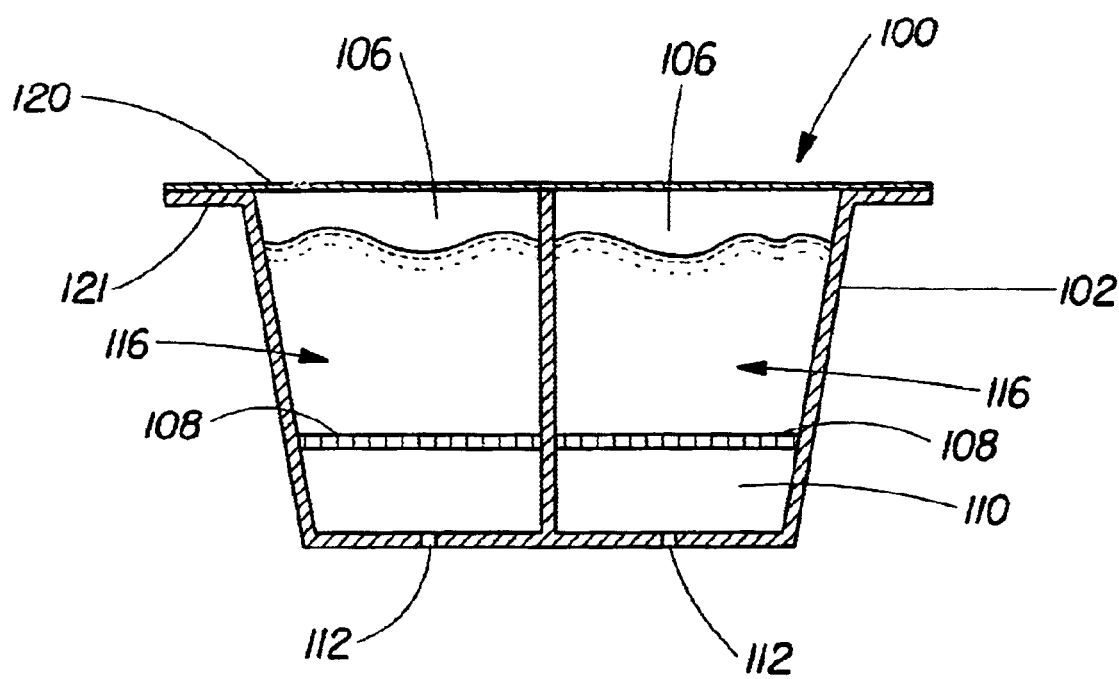
FIG. 1 is a cross sectional view of one embodiment of a multi-chambered beverage brewing device.
Figure 2:
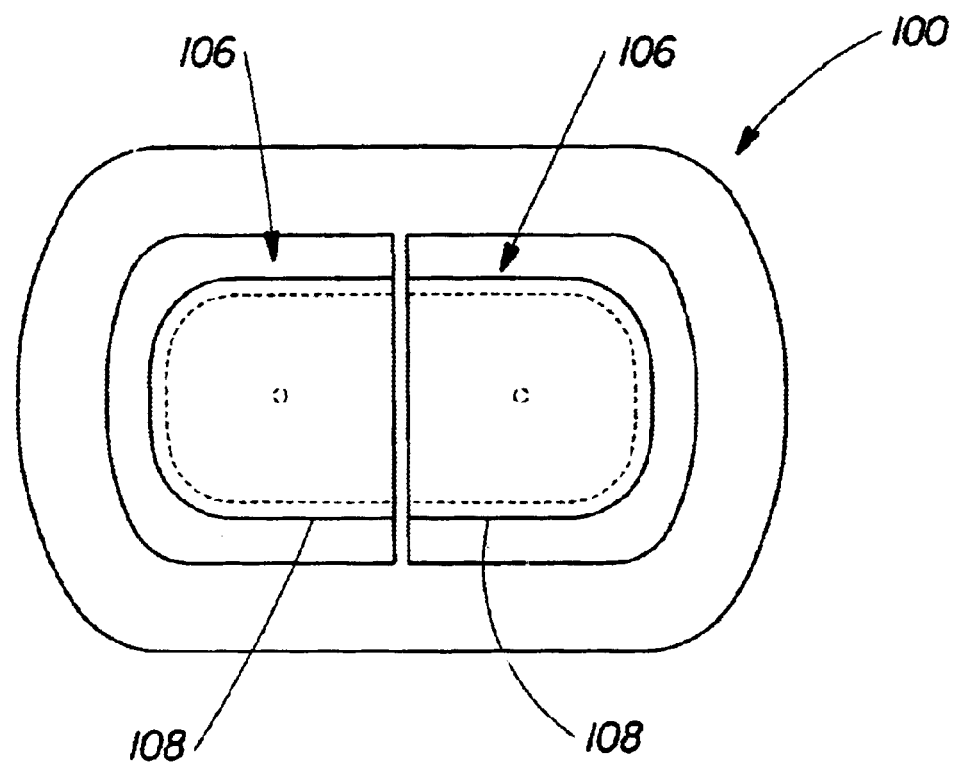
FIG. 2 is a top planar view of the multi-chambered beverage brewing device shown in FIG. 1.

The present invention relates to devices for preparing brewed beverage compositions. In particular, the present invention relates to novel processes for preparing brewed beverage compositions.

A. Definitions

As used herein, the terms "first," "second," "third," and the like are utilized to refer to, for example, the identity of various components and chambers. It will be recognized by the ordinarily skilled artisan upon reading the disclosure therein that these terms are used for convenience only, and are not meant to indicate order of importance, sequence, physical location within the beverage device, or other such characterizations.

As used herein, the term "beverage preparation time" is defined as the time from the first moment of fluid introduction to the beverage extraction chamber to the moment a sufficient amount of extract has exited the brewing device such that the beverage has the desired volume, strength, and character.

As used herein, the term "fluidized extraction environment" is defined as an environment wherein during extraction the beverage ingredients are capable of fluidizing (i.e., to be suspended in a liquid so as to induce flowing movement of the total ingredient mass).

As used herein, the term "proximately or fluidly connected" is defined as either integral, directly adjacent, directly connected, or connected by some form of tube, channel, conduit, chamber, passage, and the like that allows the migration of fluid from one location to another.

As used herein, the term "extraction headspace volume" is defined as the void volume within the ingredient extraction chamber that exists during extraction. It is the volume of space above the non-tamped, dry bulk ingredient volume.

As used herein, the term "non-tamped, dry bulk ingredient volume" is defined as the volume of the dry ingredients, prior to wetting and/or extraction.

As used herein, the term "fluid" is defined as including both the liquid and gaseous forms of a substance.

As used herein, the terms "brewing" and "extraction" are used interchangeably and are defined as the process of mass transfer of materials from the bulk ingredient to the extraction liquid. As used herein, the terms "brewing" and "extraction" are also defined as including the rehydration, solubilization, and dissolution of dry solids.

Publications and patents are referred to throughout this disclosure. All references cited herein are hereby incorporated by reference.

All percentages and ratios are calculated by weight unless otherwise indicated. All percentages and ratios are calculated based on the total composition unless otherwise indicated.

All component or composition levels are in reference to the active level of that component or composition, and are exclusive of impurities, for example, residual solvents or by-products, which may be present in commercially available sources.

As used herein, the total amount of any given component includes any added component as well as any of the components inherently present in the composition by virtue of inclusion of additional ingredients in the composition.

Referred to herein are trade names for certain articles and compositions, including the trade names for various ingredients utilized in the present invention. The inventors herein do not intend to be limited by the exact composition or formulation of a particular material identified by a specific trade name. Equivalent materials (e.g., those obtained from a different source under a different name or catalog number) to those referenced by a given trade name may be substituted and utilized in the compositions, kits, and methods herein.

In the description of the invention various embodiments and/or individual features are disclosed. As will be apparent to the ordinarily skilled practitioner upon reading the disclosure herein, all combinations of such embodiments and features are possible and can result in preferred executions of the present invention.

B. Beverage Brewing Device

The beverage brewing devices of the present invention are designed to provide an, individual serving portion of a fresh brewed, customizable brewable beverage composition. Brewable beverages include beverages such as coffee, tea, cocoa, and the like, including mixtures thereof. Though the present invention may be used in conjunction with numerous types of brewable beverages, the present invention will be described primarily with respect to coffee. One of ordinary skill in the art will appreciate that this is done simply for the convenience of the reader and is not intended to be limiting.

It is contemplated by the inventors that by using the present beverage brewing devices the consumer does not need to obtain a variety of ingredients and/or perform extensive preparation to prepare a desired, customized beverage. As such, the beverage brewing devices are particularly useful in the private home environment, although their use is not limited to that environment. Accordingly, the brewing devices will also be useful in, for example, institutions and restaurants a variety of individually customized beverages may be required at or about the same time.

In one set of embodiments of the present invention the beverage brewing devices comprise a plurality of extraction chambers (i.e., two or more) wherein each extraction chamber contains one or more components or ingredients as defined herein. These beverage brewing devices are particularly useful for the preparation of beverages where the strength, character, volume or other characteristics such as flavors, creaminess, and the like may be varied.

Typically, the beverage brewing devices of the present invention are disposable devices that are suitable for use in connection with a brewing system, such as a traditional coffee brewer or other systems described herein. As used herein, the term "disposable" with reference to a beverage brewing device means that the beverage brewing device is intended for single or other limited usage, such that the beverage brewing device is disposed of subsequent to using the device a single time or a minimal number times (usually no more than about three times). Most preferably, the beverage brewing device is intended for single use only. Where the beverage brewing device is intended for single use only, the brewing device is intended for disposal subsequent to the first use of the device.

Preferably, the beverage brewing devices described herein are intended to work in conjunction with a beverage brewing system. Suitable beverage brewing systems for use with the instant beverage brewing devices can be found in co-pending Procter & Gamble Case No. 8469M, filed Mar. 15, 2001 in the name Candido et al., titled "Beverage Brewing Systems," which is herein incorporated by reference.

The brewing devices of the present invention comprise a housing in which one or more ingredient extraction chambers are located. Disposed on the housing is a fluid introduction site, through which fluid from the beverage brewing system is introduced to an ingredient extraction chamber. The fluid mixes with the beverage ingredients to form a beverage extract. Proximately or fluidly connected to the ingredient extraction chamber is a filter. By "proximately or fluidly connected" it is met that the fluid passes either directly from one described component or assembly of the beverage brewing device to another. The term proximately or fluidly connected is also meant to encompass passing from one described component or assembly to another via a channel, conduit, passage, tube, or other such similar means.

The beverage extract from the ingredient extraction chamber passes through a filter to remove undesirable suspended solids, and/or excess amounts of materials that in limited quantities would be preferred, from the extract solution. After passing through the filter media the extract exits the beverage brewing device, through the housing, at an extract exit site. Prior to exiting the beverage brewing device the device may optionally collect in an extract collection chamber. The optional extract collection chamber is proximately or fluidly located between the filter media and the extract exit site.

(i) Housing

The beverage brewing devices of the present invention comprise a housing. The housing in use may be exposed directly to the atmosphere and have at least a portion in physical contact with the beverage brewing system. The housing encloses the various chambers, conduits, channels, components, assemblies, and sub-assemblies of the brewing device.

Depending on the exact configuration of the beverage brewing device an interior surface of the housing may form at least a portion of the walls, partitions, and enclosures of the various chambers, conduits, channels, components, assemblies, and sub-assemblies of the brewing device.

The housing may be constructed of a rigid, semi-rigid, or non-rigid material, or combinations thereof. Suitable materials include, but are not limited to, plastics, PET, foil, film, paper, and the like. The beverage brewing device, housing, and various chambers, conduits, channels, components, assemblies, and sub-assemblies can be formed from a variety of methods depending the exact configuration desired. Suitable methods include, but are not limited to, thermoforming, injection molding, and combinations thereof.

Preferably, the configuration of the brewing device housing is selected to be gas and moisture impermeable, such that the interior of the beverage brewing device and the corresponding ingredients are protected from exposure to the outside atmosphere. This ensures that the freshness and integrity of the ingredients contained within the beverage brewing device are preserved.

Alternatively, and equally preferable, the freshness and integrity of the enclosed ingredients is preserved by enclosing the beverage brewing device in a gas and/or moisture impermeable mother bag. In such circumstances it is not necessary that the beverage brewing device itself also be gas and/or moisture impermeable.

(ii) Fluid Introduction Site

The fluid introduction site is a region or location on the housing where brewing fluid (typically water in the temperature range of from about 150° F. to about 210° F.) enters the beverage brewing device. The fluid introduction site is proximately or fluidly connected to one or more ingredient extraction chambers. As used herein, the term "proximately or fluidly connected" is defined as either directly adjacent or connected by some form of tube, channel, conduit, chamber, passage, and the like that allows the flow of fluid from one location to another.

The fluid introduction site can either be form-ed by the beverage brewing system after introduction of the beverage brewing device to the beverage brewing system (e.g., by tearing, piercing, dissolving, crushing, pinching, bending, puncturing, and the like); formed during construction or assembly of the beverage brewing device and its components and subassemblies; formed by the user (e.g., by removal of a tear strip, puncturing, and the like); or by some combination thereof.

The fluid introduction site may be proximately or fluidly connected to the ingredient extraction chamber, such as where a portion of the housing forms at least a portion of one of the walls of the ingredient extraction chamber, or my be fluidly connected, for example by some form of tube, channel, conduit, chamber, passage, and the like that allows the flow of fluid from fluid introduction site to the ingredient extraction chamber.

The exact number and placement of fluid introduction sites on the housing is dependant on the particular design of the beverage brewing device. A brewing device having a single ingredient extraction chamber may necessitate only one fluid introduction site. However, the geometry of the ingredient extraction chamber and location within the beverage brewing device, amongst other variables, may make it preferable to have multiple fluid introduction sites. This may be done for a variety of reasons, for example, to aide in the delivery of a given volume of brewing fluid to the extraction chamber within a given amount of time; to aide in the mixing, dissolution, solubilization, and/or extraction of ingredients; or combinations thereof.

In beverage brewing devices comprising multiple ingredient extraction chambers there may be one fluid introduction site that is fluidly connected to the various ingredient extraction chambers. Alternatively, the single fluid introduction site could be proximately connected to at least one of the multiple ingredient extraction chambers and fluidly connected to the remainder.

In alternate embodiments, beverage brewing devices comprising multiple ingredient extraction chambers may preferably have more than one fluid introduction sites. In such embodiments, a fluid introduction site may be proximately connected to each ingredient extraction chamber, or each ingredient extraction chamber could have more than one fluid introduction site that is proximately or fluidly connected to it, and the like.

(iii) Ingredient Extraction Chamber

The beverage brewing devices of the present invention comprise one or more ingredient extraction chambers. The ingredient extraction chamber is constructed so as to provide a fluidized extraction environment. As used herein, the term "fluidized extraction environment" is defined as an environment wherein during extraction the beverage ingredients are capable of fluidizing (i.e., to be suspended in a liquid so as to induce flowing movement of the total ingredient mass).

It has been found that fluidization of the ingredients allows for higher degrees of extraction and/or solubilization of the ingredients resulting from increased surface activity of the ingredient particles. Additionally, a fluidized brewing environment (as opposed to a packed bed brewing environment, obviates the need for the costly, inconvenient, and complex high pressure brewing systems currently used in the art.

During normal operations the beverage brewing devices of the present invention are subjected to a maximum pressure during any stage of the brewing process of less than about 20 psig, preferably less than about 15 psig, preferably less than about 10 psig, more preferably less than about 5 psig. During normal operation, the maximum pressure experienced in the ingredient extraction chamber during the extraction phase is less than about 7 psig, preferably less than about 5 psig, preferably less than about 3 psig, more preferably less than about 1 psig. Optionally, at a point subsequent to extraction (i.e., after about 90% of the extractable materials required to make the particular desired beverage are extracted from the ingredients) the beverage brewing system will purge the beverage brewing device of remaining desirable particles and beverage components with a brief blast of hot fluid (e.g., hot water and/or steam).

During the optional purging step, the pressure in the ingredient extraction chamber is greater than the pressure during extraction, however, the pressure will be less than about 20 psig, preferably less than about 15 psig, preferably less than about 10 psig, more preferably less than about 5 psig. The use of a purging fluid (i.e., hot water and/or steam) in the beverage brewing device can also be employed to aide in the creation of foam in the finished beverage.

The movement and suspension of the ingredient particles permit them to be quickly and easily surrounded by the brewing liquid, thereby facilitating extraction and/or dissolution. Moreover, fluidized brewing greatly decreases the occurrence of disadvantageous channeling that is commonly observed in other methods of brewing.

Employment of a fluidized brewing environment in the ingredient extraction chamber has also been found to aide in the rapid extraction and/or solubilization of the various ingredients, as measured by beverage preparation time. Preferred beverage preparation times are less than about 120 seconds, more preferably less than about 90 seconds, more preferably less than about 75 seconds, more preferably less than 60 seconds.

Proper fluidization of the ingredient extraction chamber is accomplished by providing a suitable ingredient extraction chamber geometry during the extraction phase.

Suitable ingredient extraction chambers are those that have a ratio of total ingredient extraction chamber volume during extraction to non-tamped, dry bulk ingredient volume in excess of about 1.0:1.0. Preferably in excess of about 1.2:1.0, more preferably in excess of about 1.3:1.0, more preferably in excess of about 1.4:1.0, more preferably in excess of about 1.5:1.0. Both the total ingredient extraction chamber volume and the non-tamped, dry bulk ingredient volume can be measured using any suitable measure of volume, including cubic centimeters.

Alternatively, a suitable fluid extraction chamber geometry for fluidized extraction can be expressed as the ratio of extraction chamber head space volume to non-tamped, dry bulk ingredient volume. Preferably the ratio of extraction chamber head space volume to non-tamped, dry bulk ingredient volume is in excess of about 0.1:1.0. More preferably the ratio is in excess of about 0.25:1.0, more preferably in excess of about 0.5:1.0. Both the head space volume and the non-tamped, dry bulk ingredient volume can be measured using any suitable measure of volume, including cubic centimeters.

Relatively early in the brewing phase of fluidized brewing it is important to place a sufficient volume of brewing fluid (e.g., flooding the ingredient extraction chamber so that the ingredient particles are allowed to expand and float within the flooded chamber) into the ingredient extraction chamber to insure proper extraction and/or solubilization of the ingredients. This is done prior to the exiting of the resulting extract from the ingredient extraction chamber, which is accomplished by maintaining a flow rate of brewing fluid into the ingredient extraction chamber that is greater than the flow rate out of the chamber.

In the fluidized brewing environment of the present invention, once a sufficient volume of brewing fluid has entered the ingredient extraction chamber (e.g., a hydrostatic condition has been obtained and/or the head pressure within the chamber is greater than or equal to the pressure drop across the filter media at a point during maximum ingredient extraction chamber volume) then the flow rate of fluid into the chamber will equal the flow rate of resulting extract out of the chamber.

The various containment walls of the ingredient extraction chamber can be comprised of rigid, semi-rigid, or non-rigid materials, including combinations thereof. The various containment walls of the ingredient extraction chamber may change their shape and/or rigidity, depending on the material selected and the given stage within the brewing process. By way of example, at least a portion of the ingredient extraction chamber containment wall(s) may be of a given shape and rigidity during transportation and storage of the beverage brewing device. However, during or immediately following the introduction of the brewing fluid that portion of the containment wall(s) becomes less rigid and changes shape so as to increase the total volume of the ingredient extraction chamber during brewing.

One or more portions of the containment walls that define the region of the ingredient extraction chamber may be comprised of other beverage brewing device components, compartments, chambers, assemblies, and sub-assemblies. For example, the filter media may comprise one portion of the ingredient extraction chamber, where the beverage brewing device housing may comprise yet another portion.

(iv) Filter Media

The beverage brewing devices of the present invention comprise a filter media to remove undesirable insoluble particles from the ingredient extract prior to inclusion in a final beverage composition. The filter media is proximately or fluidly located between the ingredient extraction chamber and the extract collection chamber.

The filter media can be constructed from a variety of materials including, but not limited to, plastic, foil, non-woven polyester, polypropylene, polyethylene, paper materials, and combinations thereof. The filter media comprises one or more filtering orifices that allow the free passage of an extract solution, while simultaneously preventing the passage of a significant amount (i.e., in excess of 90%) of dispreferred insoluble ingredient particles and contaminants.

The filtering orifices may be formed in the filter media during creation of the filter media; inherent in the filter media material or combination of materials; formed as a result of one or more steps of the brewing process; or any combination thereof. For example, the filter media may be a continuous film, absent any filtering orifices during shipping and storage, and have the filtering orifices formed when the filter media contacts the brewing fluid. Alternatively, the filtering orifices may be formed in a continuous filter media by mechanical means applied to either side, such as piercing, tearing, puncturing, and combinations thereof. The orifices may also be formed by air pressure (e.g., blowing open or piercing the filter media material), water pressure, heat, lasers, electrical resistance, and the like.

As stated, the filtering orifices should be of sufficient size to allow the substantially unfettered passage of an extract solution, while simultaneously preventing the passage of a significant amount (i.e., in excess of 90%) of dispreferred insoluble particles. However, it is within the scope of the present invention that the orifices may have a variable geometry. This would depend on the force and/or pressure exerted against the portion of the filter media exposed to the extract solution, and the physical properties of the filter media material(s) selected (e.g., elasticity, tensile strength, and the like).

The filter media could be fashioned from one or more suitable filter media materials such that the filtering orifices would expand in size as pressure and/or force were applied. This would aide in the prevention of clogging, while simultaneously inhibiting the passage of a significant amount (i.e., in excess of 90%) of unacceptable particles and compounds.

In the fluidized brewing environment of the present invention the filter is of sufficient design and construction so as to withstand a pressure drop of less than about 15 psig, preferably less than about 10 psig, more preferably less than about 5 psig. During normal operations, pressure drops across the filter media during the extraction of ingredients will be less than about 5 psig, preferably less than about 3 psig, more preferably less than about 1.5 psig.

(v) Extraction Collection Chamber

The beverage brewing devices of the present invention may optionally comprise one or more extraction collection chambers. The optional extraction collection chamber is proximately or fluidly connected to the both the filter media and the ingredient extraction chamber.

The various containment walls of the extraction collection chamber may be comprised of a rigid, semi-rigid, or non-rigid material, including combinations thereof. The various containment walls of the extraction collection chamber may change their shape and/or rigidity, depending on the material selected.

The exact geometry (i.e., design) of the extraction chamber can be selected so as to aide in the formation of foam (e.g., through the use of mechanical impingement of the beverage extract) with a given set of foam characteristics (e.g., height, density, and the like) in the finished beverage composition.

(vi) Extraction Exit Site

The extraction exit site is a region or location on the housing where the finished beverage solution exits the beverage brewing device. The extraction exit site is proximately or fluidly connected to one or more extraction collection chambers. The extraction exit site can either be formed by the beverage brewing system after introduction of the beverage brewing device to the beverage brewing system (e.g., by tearing, piercing, dissolving, crushing, pinching, bending, puncturing, and the like); formed during construction or assembly of the beverage brewing device and its components and subassemblies; formed by the user (e.g., by removal of a tear strip, puncturing, and the like); or by some combination thereof.

The exact geometry (i.e., orifice shape and size) of the extraction exit site can be selected so as to aide in the formation of foam, with a given set of foam characteristics (e.g., height, density, and the like), in the finished beverage composition. Suitable foam generation can also be accomplished by conjointly employing the extraction exit site geometry with a steam and/or liquid purge of the beverage brewing device at the end of the brewing cycle.

The steam and/or liquid purge momentarily increases the pressure inside the beverage brewing device to less than about 15 psig, preferably less than about 10 psig, more preferably less than about 5 psig. As the remaining purged ingredients exit the beverage brewing device they experience a pressure drop at the extraction exit site that accelerates their velocity and facilitates foam generation in the finished beverage. The purge also removes any additional extracted portions that remain trapped in the various components, chambers, assemblies, and sub-assemblies of the beverage brewing device.

During normal operation, the beverage brewing device experiences a pressure drop across the extraction exit site of less than about 5 psig, preferably less than about 3 psig, more preferably less than about 1 psig.

Preferably, the extraction exit site is of suitable design such that the finished beverage solution exits the beverage brewing device as droplets. Equally preferable are extraction exit sites that permit the finished beverage solution to exit the beverage brewing device as a continuous stream.

(vii) Fluid Bypass Conduit

The beverage brewing devices of the present invention may optionally comprise one or more fluid bypass conduits. The fluid bypass conduit is proximately or fluidly connected to the extraction exit site. The fluid bypass conduit is a channel, tube, conduit, chamber, and the like that permits the brewing fluid to pass from the fluid introduction site to the extraction exit site without having to pass through an ingredient extraction chamber.

(viii) Beverage Brewing Device Recognition System Components

The beverage brewing devices of the present invention may optionally comprise one or more beverage brewing device recognition system components. The beverage brewing device recognition system allows the beverage brewing system to recognize the presence, type and/or capabilities of the beverage brewing device inserted into the system by the consumer, without the need for the consumer to provide such information. For example, a beverage brewing device recognition system would recognize the exact type of beverage brewing device inserted (e.g., number of ingredient extraction chambers, orientation, and required flow path, and the like), recognize the ingredients contained therein (e.g., coffee, tea, creamy ingredients, combinations thereof, and the like), and identify and initiate the appropriate processing conditions required to achieve the desired finished beverage characteristics.

Suitable methods for recognition of the beverage brewing device include physical obstructions, voids, nodules, bumps, ridges, holes, recesses, protrusions, and the like, including combinations thereof. These physical recognition system components are preferably located on the beverage brewing device housing where, following insertion of the brewing device, they can interact with the recognition system components of the beverage brewing system (e.g., circuit switches). The combination of interactions indicate to the beverage brewing system the presence, type and/or capabilities of the inserted beverage brewing device.

Other suitable recognition system components for signaling to the beverage brewing system the type and capabilities of the inserted beverage brewing device include barcodes, magnetic strips, optical recognition, microchips, and the like, including combinations thereof. The type and capabilities of the beverage brewing device can be encoded into the recognition component of the device and read by a suitable corresponding component located on the beverage brewing system.

(ix) Flow Path

The flow path of the brewing fluid and the extraction through the beverage brewing device is generally characterized as either unidirectional or multidirectional. As used herein, the term "unidirectional flow path" is defined as passing through a beverage brewing device along a primary directional axis, without substantially reversing direction along that axis (i.e., the change in direction from the original vector of entry is less than about 100°). However, travel along a flow path that is not along the primary directional axis is acceptable (e.g., horizontal migration where the primary directional axis is vertical) as long as the flow path does not substantially reverse direction.

As used here, the term "multidirectional flow path" is defined as passing through the beverage brewing device along a primary directional axis, and at some point during fluid/extract migration experiencing a substantial reversal in direction along the primary axis (i.e., the change in direction from the original vector of entry is in excess of about 100°). However, travel along a flow path that is not along the primary directional axis is also acceptable (e.g., horizontal migration where the primary directional axis is vertical).

Take, for example, a beverage brewing device where the brewing fluid enters the brewing device at the vertical most point of the device and travels along a substantially vertical axis from top to bottom., subsequently exiting the brewing device at a point below the point of fluid introduction. A unidirectional flow path would be one where the fluid/extraction does not substantially reverse direction (though horizontal flow path segments (e.g., changes in direction of about 90° from the original vector of entry) are acceptable) and travels from substantially from the top of the beverage brewing device to the bottom. A multi-directional flow path would be one where the fluid/extraction experiences a substantial reversal in direction along the vertical axis (e.g., the flow path travels vertically from top to bottom and then reverses direction from bottom to top, in other words experiences a change in direction from the original vector of entry of about 180°).

Having now described the various parts, components, chambers, assemblies, and sub-assemblies of the beverage brewing device, one of ordinary skilled in the art will appreciate that the sequence and order of explanations is not intended to be limiting. The various combination and permutation of components, chambers, assemblies, and sub-assemblies of the instant beverage brewing devices is dependent on the desired finished beverage characteristics (e.g., strength, character, volume, beverage preparation time, optional ingredients, and the like).

C. Customization

The beverage brewing devices of the present invention optionally allow for customization of a final beverage's strength, character, volume, and combinations thereof. In general, customization of the finished beverage is accomplished by controlling such variables as brewing fluid flow rate, brewing fluid temperature, and fluid contact time with the beverage ingredients. Additionally, customization can be achieved by controlling the amount of ingredients exposed to the brewing fluid (e.g., providing multiple ingredient extraction chambers comprising fixed ingredient amounts) and the volume of brewing fluid that is allowed to pass through the ingredient extraction chamber(s), relative to the total liquid volume in the finished beverage (e.g., fluid bypass).

(i) Beverage Strength Control

The strength of brewed beverages prepared using the beverage brewing devices of the present invention are typically characterized as a function of the brew solids value. The brew solids value is an indication of the mass transfer that has occurred from the solid grounds to the water phase during brewing, and is simply the coffee solids remaining after oven drying the brewed coffee beverage.

The brew solids value is defined as the weight of coffee solids in an extract solution, divided by the total weight of the solution. This value is typically expressed as a percentage. The weight of the coffee solids is measured as the weight of materials that remain after oven drying the finished extract solution. The brew solids value may also be measured utilizing to the analytical method described hereinafter.

Analytical Method:

The brewed coffee beverage is placed in a 12 ml sealed vial and allowed to cool to a temperature of 29° C. The sample is then analyzed for solids content by the index of refraction method using a Bellingham & Stanley RFM 81, where the sample temperature during the measurement is maintained at 29° C. The readings are correlated with readings of reference solutions of known brew solids content based on oven drying techniques using a correlation of: Refractive Index=0.001785×(% brew solids)+1.331995.

Coffee compositions derived from the inventions herein preferably have a brew solids value in the range of from about 0.2 to about 1.5, more preferably in the range of from about 0.3 to about 1.2, more preferably in the range of from about 0.4 to about 1.0.

(i)(1) Multiple Ingredient Extraction Chambers

When brewing beverages with fixed quantities of brewing fluids (typically hot water in the temperature range of from about 150° F. to about 210° F.), customization of beverage strength (i.e., brew solids value) is accomplished by controlling the ratio of brewing fluid to extractable ingredient (e.g., coffee, tea, cocoa, and the like). With respect to coffee, the strength of a finished brewed coffee beverage may be increased by increasing the amount of coffee a fixed volume of brewing fluid passes through, relative to the fixed volume of brewing fluid. Likewise, by increasing the amount of brewing fluid relative to the amount of coffee, a beverage's strength may be decreased. Additional coffee can be provided in the beverage brewing devices of the present invention by providing additional ingredient extraction chambers comprising coffee ingredients.

For example, in one embodiment of the present invention a beverage brewing device comprising two ingredient extraction chambers is provided, each with a given volume of roast and ground coffee. The first ingredient extraction chamber contains from about 10% to about 50% of the total quantity of roast and ground coffee in the beverage brewing device. Preferably from about 35% to about 45%, more preferably about 40%. The second ingredient extraction chamber contains from about 50% to about 90% of the total quantity of roast and ground coffee in the beverage brewing device. Preferably from about 55% to about 75%, more preferably about 60%.

To make a finished brewed beverage of mild strength, substantially all (i.e., about 100%) of the brewing fluid is directed through the first ingredient extraction chamber containing 40% of the total coffee ingredients. To make a finished brewed beverage of average strength, substantially all (i.e., about 100%) of the brewing fluid is directed through the second ingredient extraction chamber containing 60% of the total coffee ingredients.

To make a finished brewed beverage of strong strength, the quantity of brewing fluid is divided between the two ingredient extraction chambers, wherein a first portion of the brewing fluid is directed to the first ingredient extraction chamber, and a second portion of the brewing fluid is directed to the second ingredient extraction chamber. Preferably the proportions of brewing fluid passing through the ingredient extraction chambers approximately correspond to the proportions of coffee ingredients in each ingredient extraction chamber. For example, in an embodiment where the total quantity of coffee ingredients is divided between two extraction chambers by the ratio of about 40% to about 60%, the first portion of brewing fluid passing through the first ingredient extraction chamber contains from about 10% to about 50% of the total quantity of brewing fluid. Preferably from about 35% to about 45%, more preferably about 40%. The second portion of brewing fluid passing through the second ingredient extraction chamber contains from about 50% to about 90% of the total quantity of brewing fluid. Preferably from about 55% to about 75%, more preferably about 60%.

One of ordinary skill in the art will appreciate that the number of different beverage strengths obtainable by way of the present invention is, in part, a function of the beverage brewing device's design and construction. The greater the number of ingredient extraction chambers provided, and the ability to appropriately direct portions of the brewing fluid to each chamber, the greater the number of beverage strength settings that can be provided.

(i)(2) Fluid Bypass

Customization of a beverage's strength in a finished brewed beverage may also be accomplished by providing a sufficient quantity of roast and ground coffee, in one or more ingredient extraction chambers, such that a fixed volume of brewing fluid passing through the roast and ground coffee ingredients will form a strong beverage. Depending on the finished beverage strength desired by the consumer the finished beverage can be diluted to the desired beverage strength (e.g., average, mild, and the like).

Dilution of the finished beverage may occur through use of a fluid bypass conduit, or other such means, incorporated into the beverage brewing device. A fixed volume of brewing fluid passes through the ingredient extraction chamber to deliver a given brew solids value. An additional volume of fluid bypasses the ingredient extraction chamber, passing through the beverage brewing device to the finished beverage container, and dilutes the finished beverage to the desired strength.

(ii) Beverage Character

As used herein, the term "beverage character" is defined as the extraction yield of the finished beverage. The extraction yield is defined as the weight of coffee solids in solution divided by the total weight of starting coffee ingredients (e.g., roast and ground coffee). This value is typically expressed as a percentage.

Preferred extraction yield values for beverages prepared from the methods and beverage brewing devices of the present invention are greater than about 10, more preferably greater than about 15, more preferably greater than about 20.

An alternative method of expressing beverage character is as the difference between the extraction yield achieved using the brewing method and apparatuses of the present invention, and a standard brewing method. This measure is often called a delta yield.

Delta yield is herein defined as the difference between the present extraction yield (as calculated above) and a standard extraction yield from the standard brewing method described below. Preferred delta yield values for beverages prepared from the methods and beverage brewing devices of the present invention are less than about 20%, more preferably less than about 15%, more preferably less than about 10%, more preferably less than about 5%, most preferably less than about 3%.

Standard Brewing Method

Coffee is brewed on a Bunn OL-35 automated drip brewer. Coffee filters are 12 cup oxygen processed Bunn Coffee filters (Reg. 6001). A weight of one ounce of coffee is added to the filter in the basket. The brewer is supplied with distilled water and feeds 1860 ml at 195° F. (90° C.) in 146 seconds to the brew basket. Brewed coffee is collected in a carafe and then mixed. Samples for the standard extraction yield are then collected and analyzed.

For a given set of ingredient characteristics (e.g., ingredient size, shape, degree of agglomeration, and the like) there are two primary methods for varying the extraction yield. The first method is to adjust the temperature of the brewing fluid. Preferred temperatures for the brewing fluid are in the range of about 150° F. to about 210° F. The greater the temperature of the brewing fluid, the higher the degree of extraction (i.e., the higher the extraction yield value, and the lower the delta yield value).

The second method for varying the degree of extraction is to adjust the time the brewing fluid is in contact with the beverage ingredients. The longer the extraction contact time, the higher the degree of extraction (i.e., the higher the extraction yield value, and the lower the delta yield value). The extraction contact time can be varied by design of the ingredient extraction chamber geometry, by alteration of the filter media area, by adjustment of the brewing fluid flow rate, and combinations thereof.

The geometry of the ingredient extraction chamber can be designed and constructed so as to retain the brewing fluid during the extraction phase for a greater or lesser amount of time. Additionally, the total filter area of the beverage brewing devices of the present invention can be adjusted either upwards or downwards to increase or decrease the extraction contact time. Finally, the flow rate of the brewing fluid can be increased or decreased to adjust extraction contact time.

(iii) Beverage Volume

Typically the liquid volume of the finished beverage will be about equal to the volume of brewing fluid that passed through the ingredients in the ingredient extraction chamber(s), less any amount that remains trapped within the ingredients and other components, compartments, assemblies, and sub-assemblies of the beverage brewing device. The total liquid volume of the finished beverage, however, may also comprise a liquid volume portion that has bypassed the ingredient extraction chamber. This would allow the consumer to create a variety of beverage sizes.

Adjustment of the finished beverage volume in isolation would have a corresponding effect on the beverages strength, as described herein. However, the customization methods previously described could be conjointly employed to overcome this effect. By way of example, a consumer may desire and select the beverage brewing system to deliver a larger volume finished beverage. In isolation, this customization would decrease the strength of the finished beverage. To compensate for this, additional ingredient extraction chambers could be employed to compensate for the reduction in beverage strength. Additionally, the temperature of the brewing fluid and/or the extraction contact time could be adjusted to vary the finished beverage's character.

While customization is a distinct advantage of the present invention, beverage brewing devices having a plurality of extraction chambers have utility independent of the use of the instant customization techniques. Accordingly, the customization options disclosed herein are not required to produce a beverage brewing device within the scope of Applicants' present invention.

D. Detailed Description of the Figures

The following examples further describe and demonstrate embodiments within the scope of the present invention. These examples are given solely for the purpose of illustration and are not to be construed as a limitation of the present invention, as many variations thereof are possible without departing from the invention's spirit and scope.

FIG. 1 is a cross sectional view of one embodiment of a multi-chambered beverage brewing device. Beverage brewing device 100 has housing 102, including a foil top 120 which is affixed to housing flange 121. Disposed inside brewing device 100 are ingredient extraction chambers 106 which contain beverage ingredients 116. Proximately connected between the ingredient extraction chambers 106 and the extraction collection chambers 110 are filter media 108. The brewing fluid enters the beverage extraction chamber 106 through the fluid introduction site 104 (not shown). A beverage extract is formed, passes through filter media 108, collects in the extraction collection chamber 110, and exits the beverage brewing device at the extraction exit site 112.

Figure 3A:
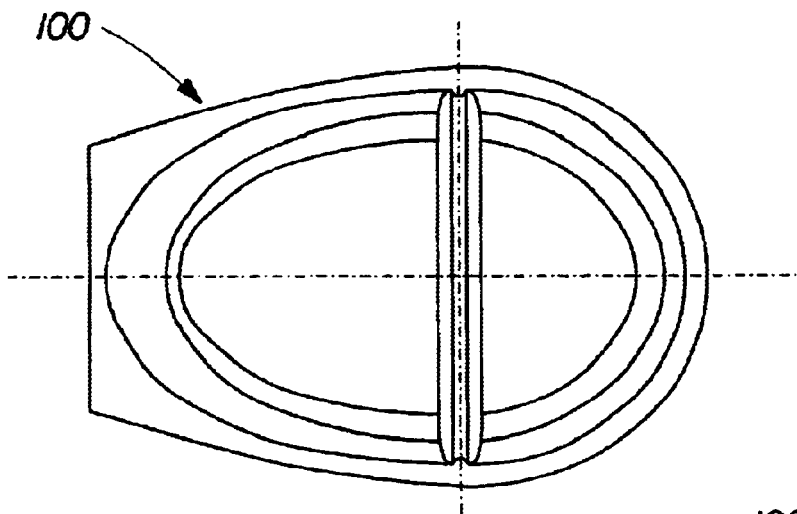
FIGS. 3a–3f are various views of one embodiment of a multi-chambered beverage brewing device.
Figure 3B:
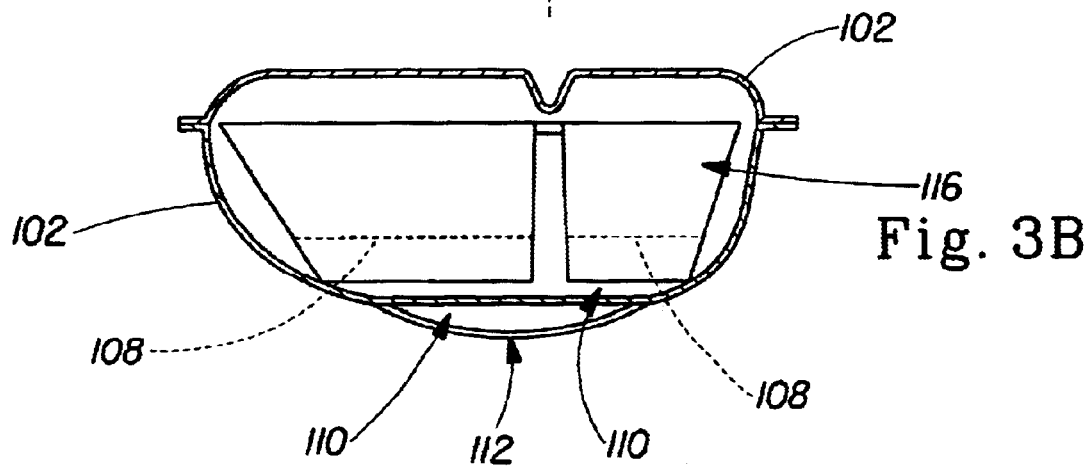
Figure 3C:
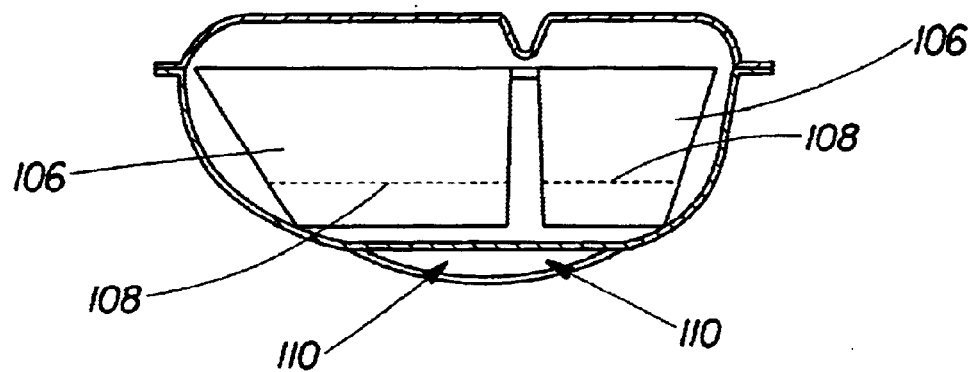
Figure 3D:
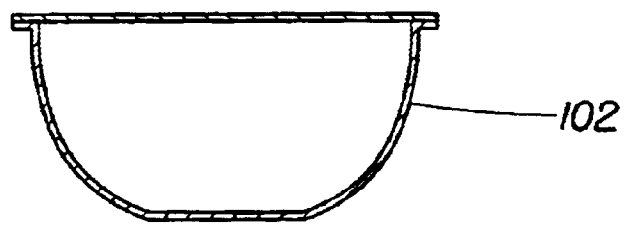
Figure 3E:
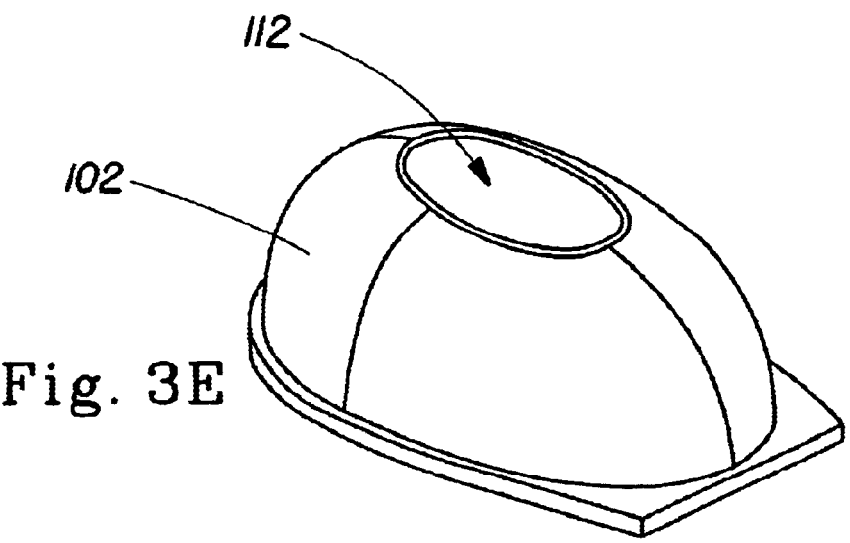
Figure 3F:
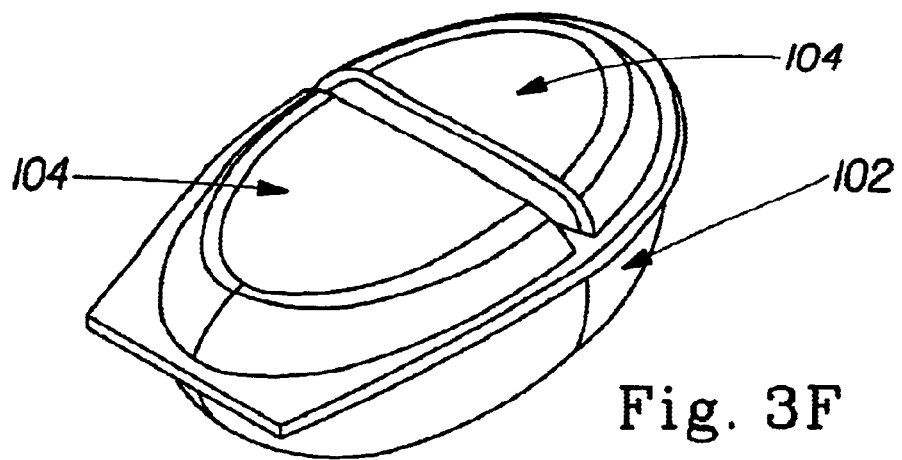
Figure 4A:
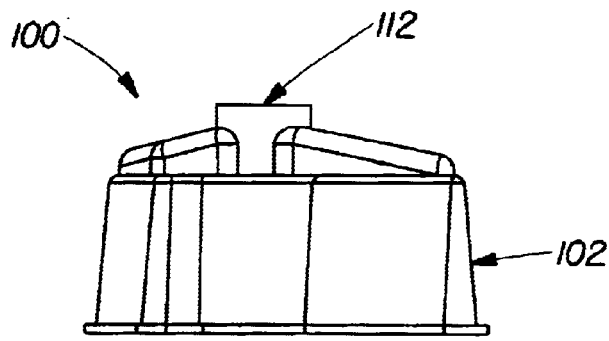
FIGS. 4a–4d are various views of one embodiment of a multi-chambered beverage brewing device.
Figure 4B:
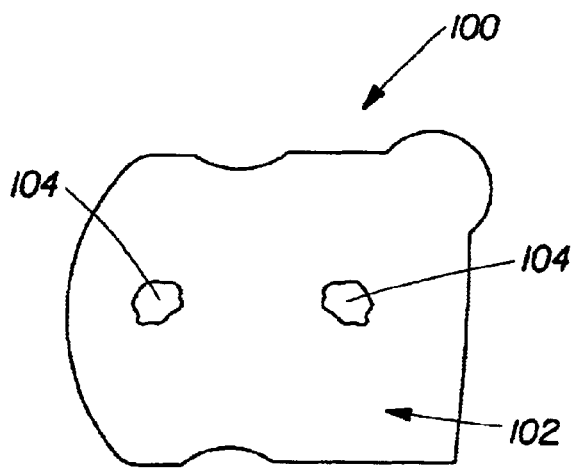
Figure 4D:
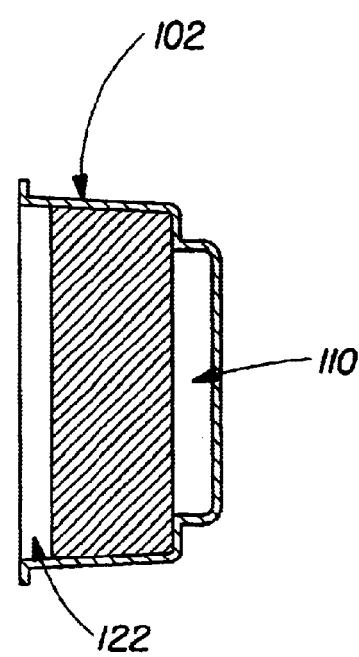
Figure 4C:
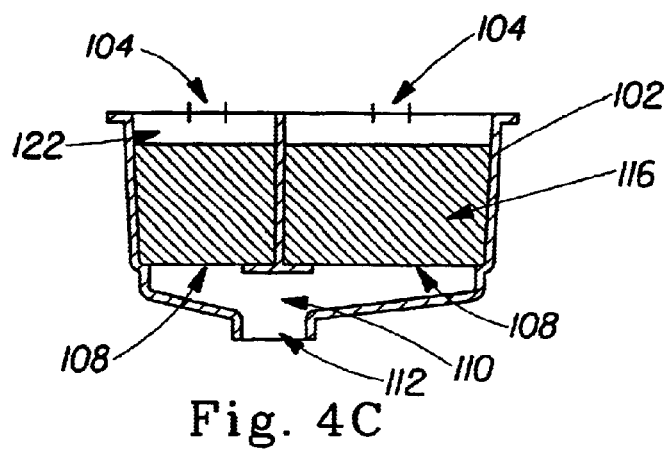

FIGS. 3a–3f are various views of one embodiment of a multi-chambered beverage brewing device 100. FIG. 3A is a top planar view of device 100. FIG. 3B is a cross sectional view of device 100 disclosing housing 102, beverage ingredients 116, filter media 108, a plurality of extraction collection chambers 110, and extraction exit site 112. FIG. 3C is another cross sectional view of device 100 showing ingredient extraction chamber 106. FIG. 3D is a perspective view of the bottom of device 100 showing housing 102 and the location of the extraction exit site 112 disposed on housing 102. FIG. 3F is a perspective view of the top of device 100 showing housing 102 and the fluid introduction site disposed on housing 102.

Figure 5A:
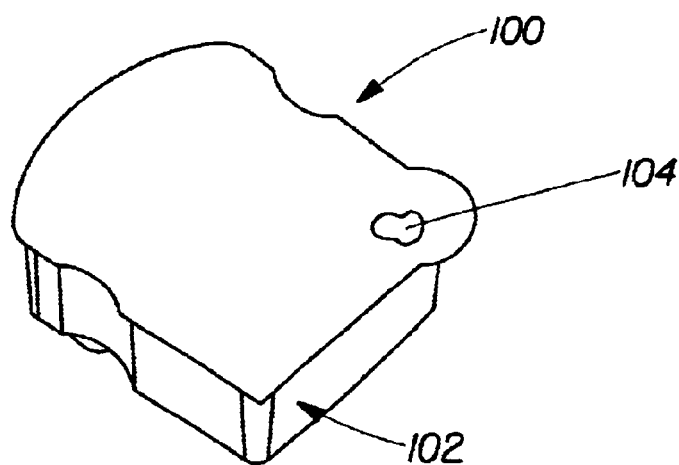
FIGS. 5a–5b are perspective views of one embodiment of a multi-chambered beverage brewing device.
Figure 5B:
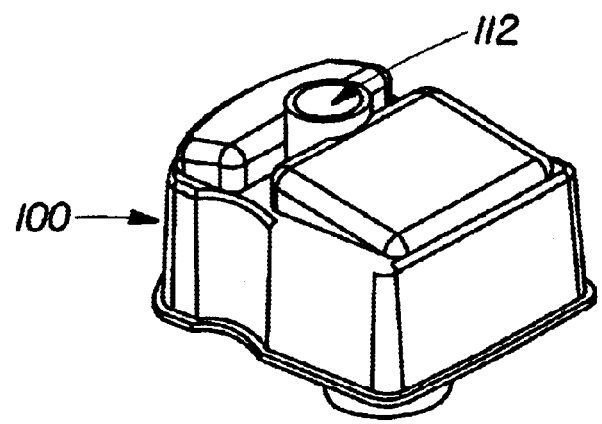
Figure 6:
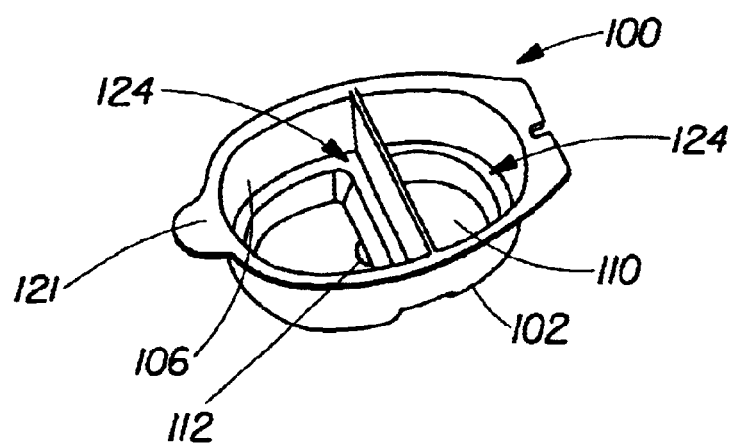
FIG. 6 is a perspective view of one embodiment of a multi-chambered beverage brewing device.

FIGS. 4a–4d are various views of one embodiment of a multi-chambered beverage brewing device. FIGS. 5a–5b are perspective views of one embodiment of a multi-chambered beverage brewing device. FIG. 6 is a perspective view of one embodiment of a multi-chambered beverage brewing device 100. In this embodiment device 100 contains ingredient extraction chambers 106. Located within chambers 106 are filter media supporting members 124 for supporting filter media 108 (not shown). Proximately connected below chamber 106 and filter media 108 are extraction collection chambers 110 and extraction exit site 112.

Figure 7A:
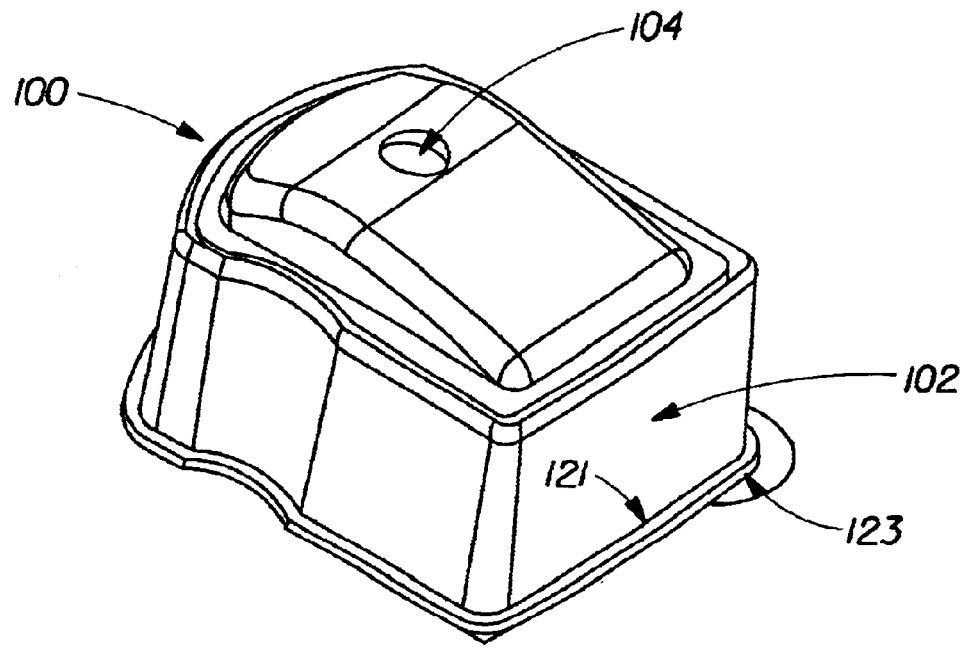
FIGS. 7a–7b are perspective views of one embodiment of a multi-chambered beverage brewing device.
Figure 7B:
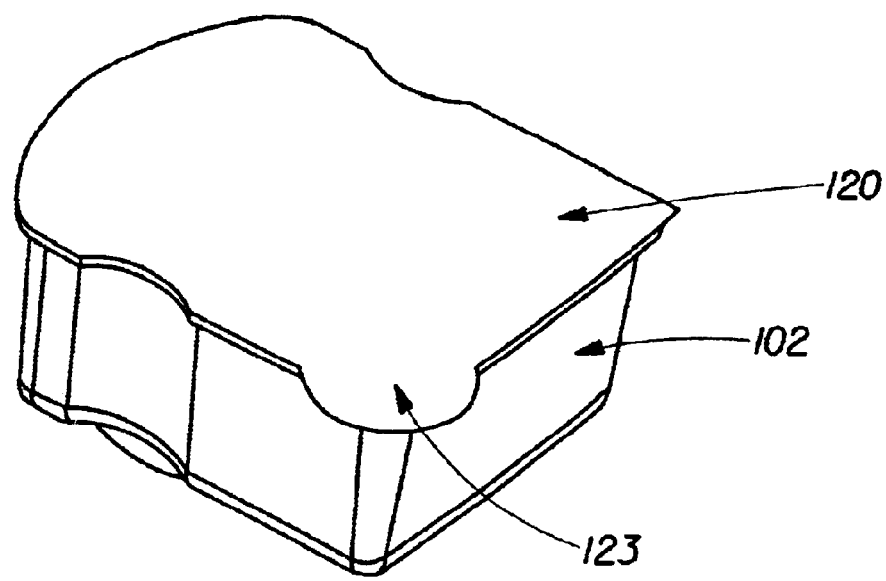

FIGS. 7a–7b are perspective views of one embodiment of a multi-chambered beverage brewing device 100. In this embodiment housing 102 further comprises a foil top 120 which is affixed to housing flange 121. Foil bottom 120 comprises pull tab 123 which is designed to be gripped by the consumer so that the consumer may remove bottom 120 from housing flange 121 to expose filter media 108 (not shown).

Figure 8A:
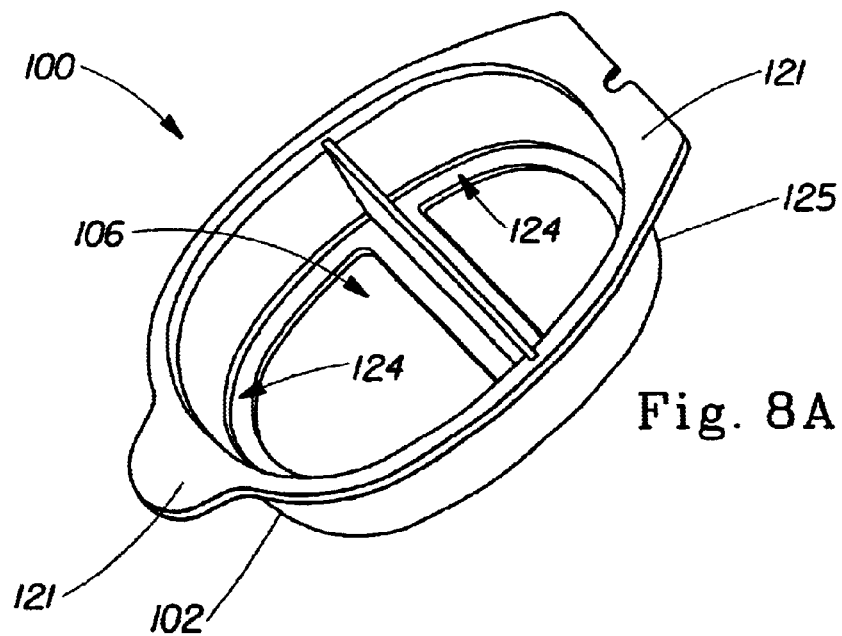
FIGS. 8a–8b are perspective views of various sub-assemblies of one embodiment of a multi-chambered beverage brewing device.
Figure 8B:
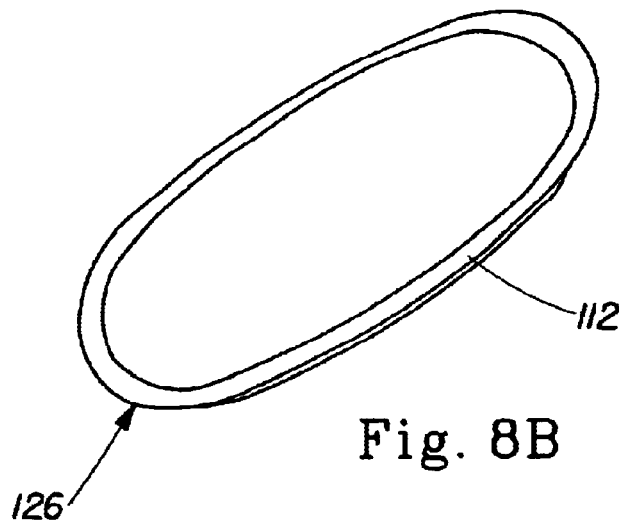

FIGS. 8a and 8b are perspective views of two sub-assemblies of one embodiment of a multi-chambered beverage brewing device 100 sub assembly 126 forms extraction collection chamber 110 and has disposed on it surface a preformed extraction exit site 112. Sub-assembly 126 mates with sub-assembly 125, which contains ingredient extraction chambers 106, on the opposing surface of filter media supporting member 124.

Figure 9:
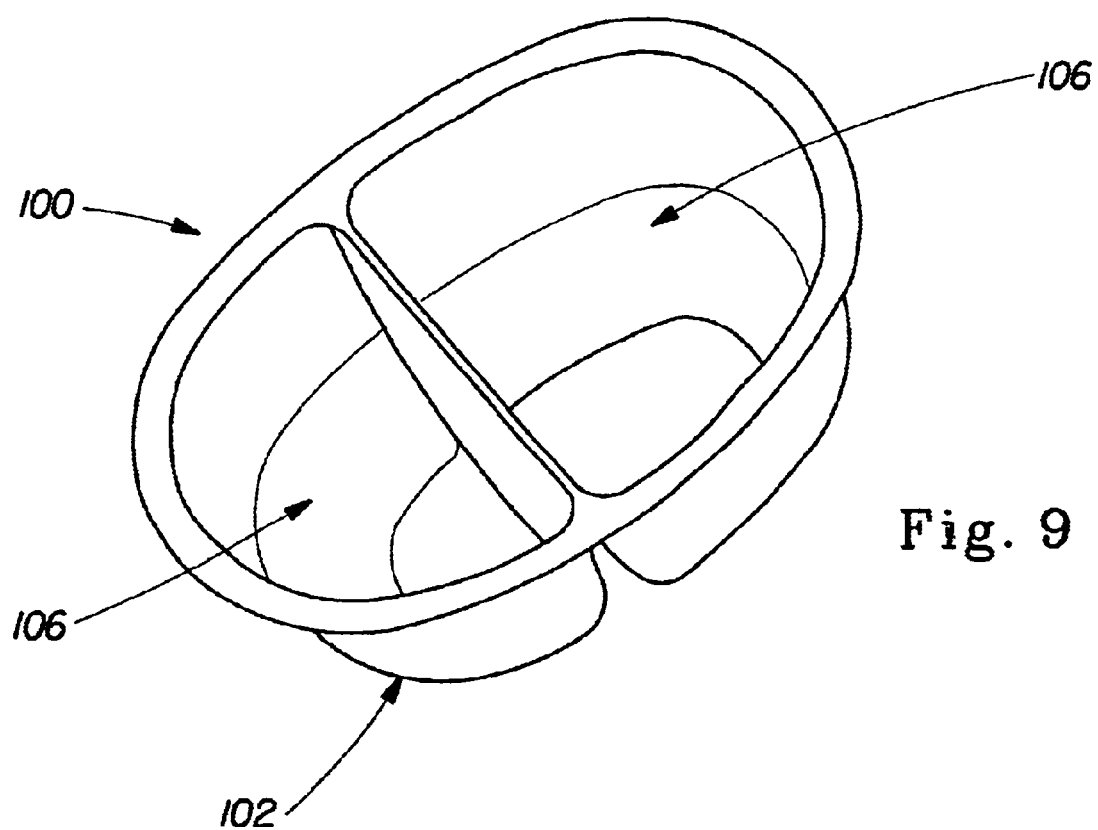
FIG. 9 is a perspective view of one embodiment of a multi-chambered beverage brewing device.
Figure 10:
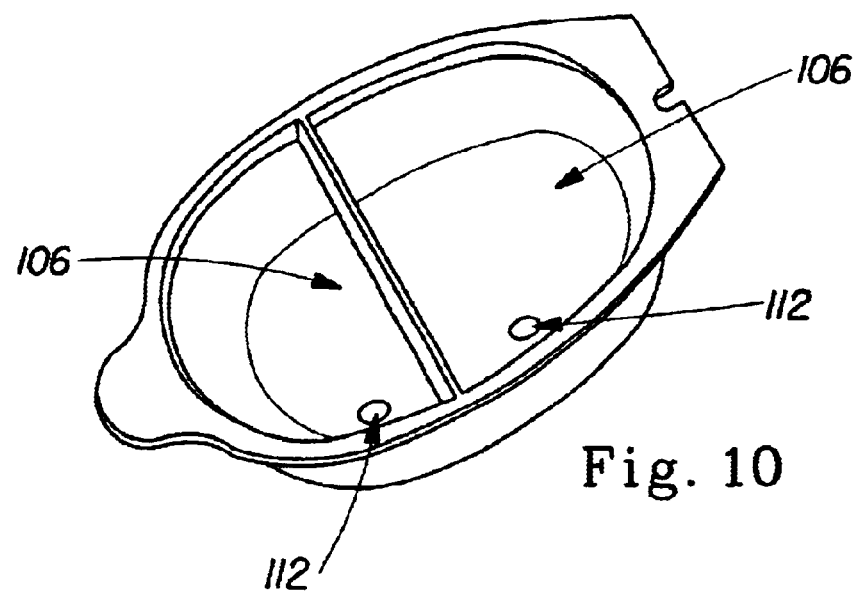
FIG. 10 is a perspective view of one embodiment of a multi-chambered beverage brewing device.
Figure 11A:
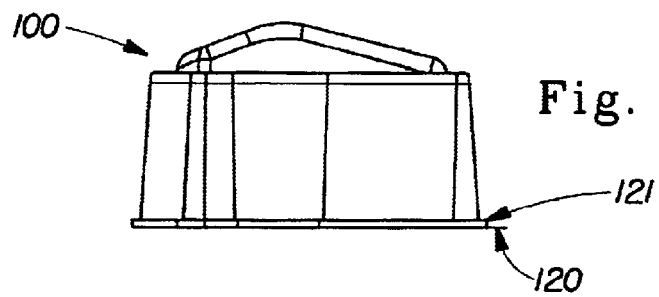
FIGS. 11a–11d are various views of one embodiment of a multi-chambered beverage brewing device.
Figure 11B:
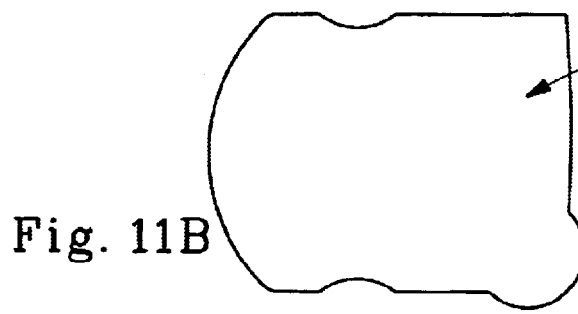
Figure 11D:
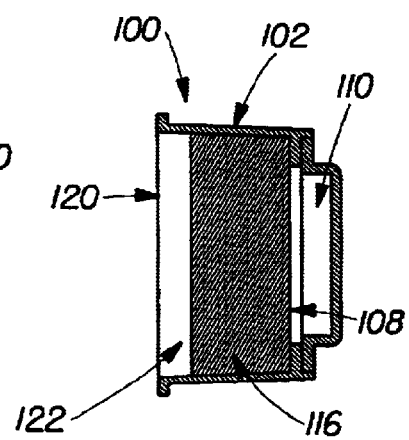
Figure 11C:
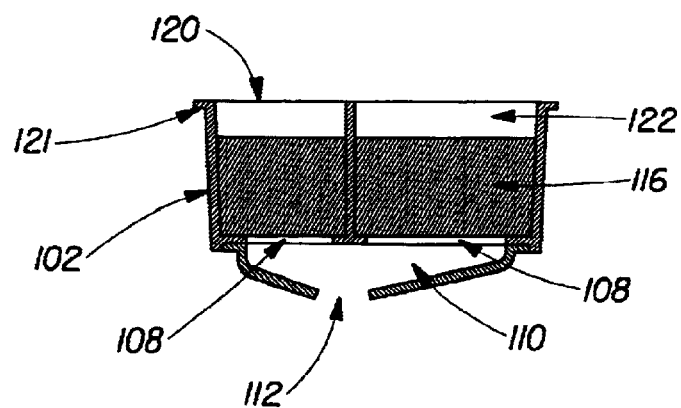

FIG. 9 is a perspective view of one embodiment of a multi-chambered beverage brewing device which does not comprise an extraction collection chamber. FIG. 10 is a perspective view of one embodiment of a multi-chambered beverage brewing device 100, without an extraction collection chamber, with preformed extraction exit sites 112.

Figure 12:
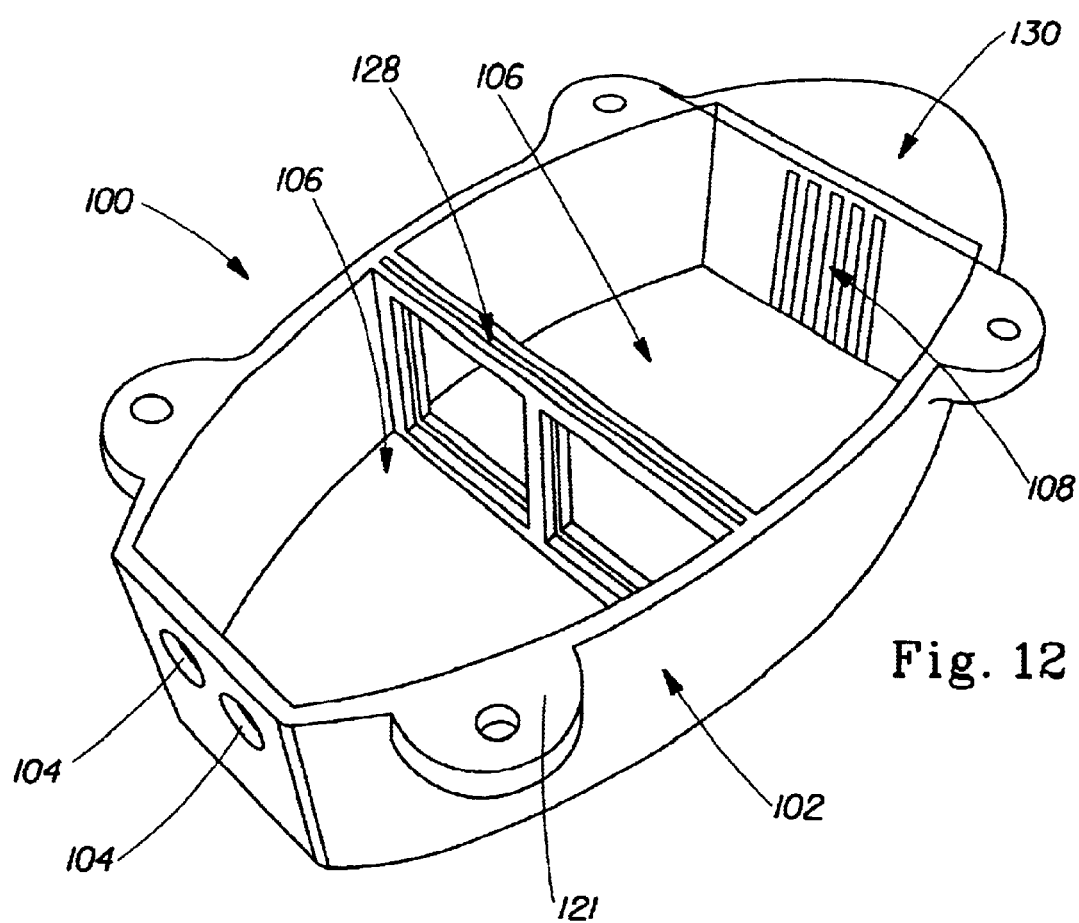
FIG. 12 is a perspective view of one embodiment of a multi-chambered beverage brewing device.
Figure 13:
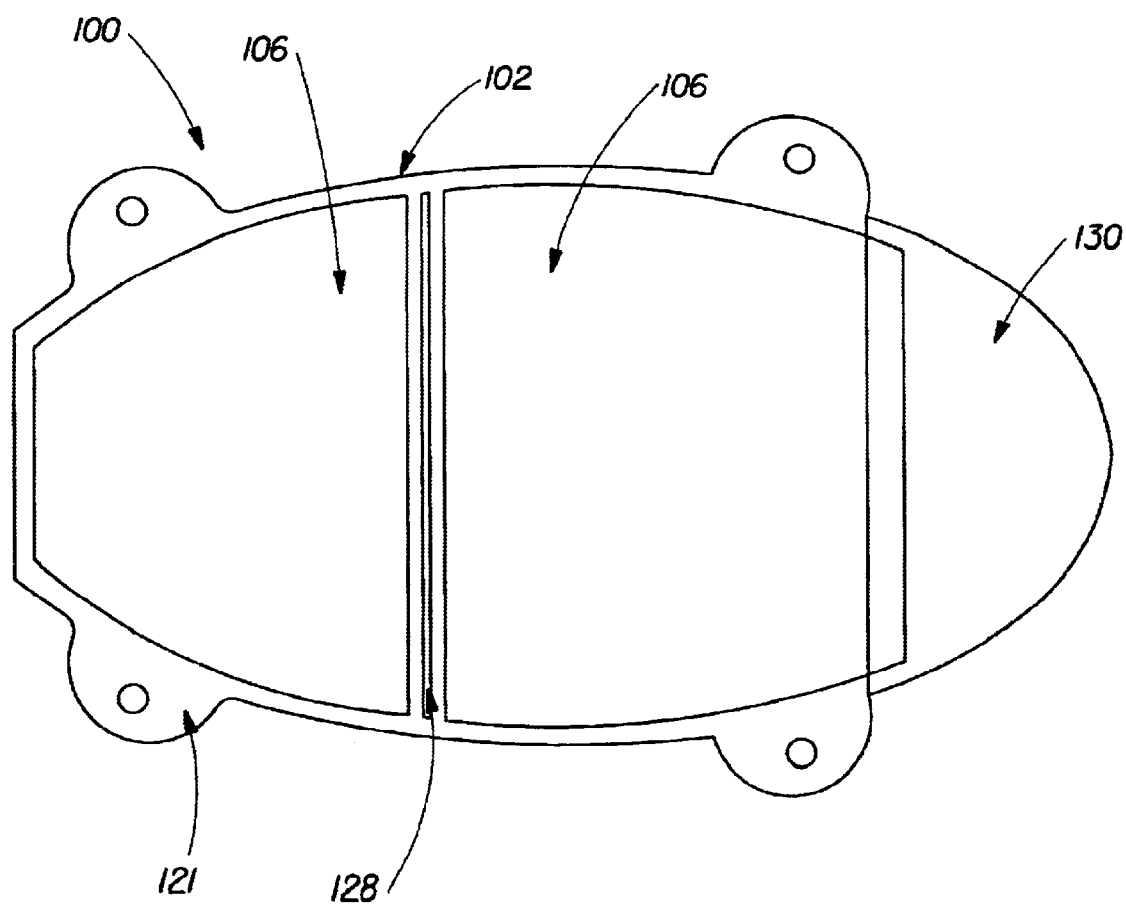
FIG. 13 is a top planar view of the embodiment of FIG. 12.

FIGS. 11a–11d are various cross-sectional and perspective views of one embodiment of a multi-chambered beverage brewing device 100. FIG. 12 is a perspective view of one embodiment of a multi-chambered beverage brewing device 100, where ingredient extraction chambers 106 are separated by divider 128. Divider 128 may optionally contain filter media 108 (not shown) for filtering the extract of solution formed in one ingredient extraction chamber before it passes through to another ingredient extraction chamber. In this embodiment filter media 108 is a grate-like structure formed as an integral part of device 100. Device 100 also has formed as an integral part of housing 102 a handle 130. FIG. 13 is a top planar view of the embodiment of FIG. 12.

Figure 14:
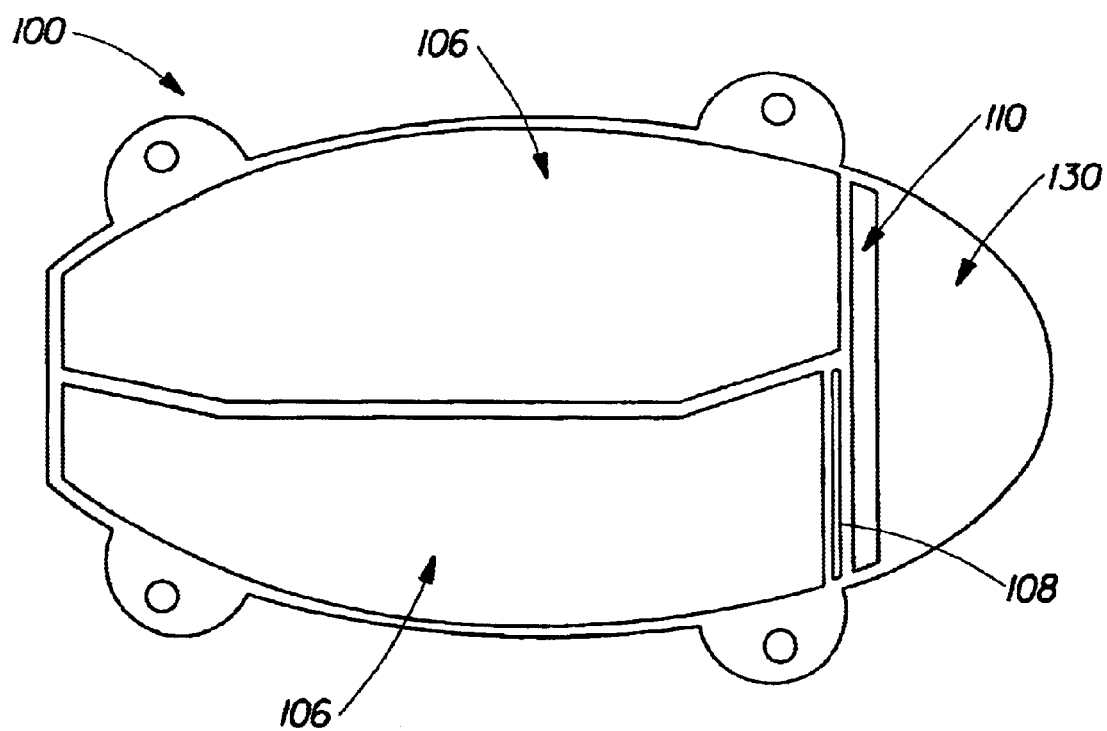
FIG. 14 is a top planar view of one embodiment of a multi-chambered beverage brewing device.

FIG. 14 is a top planar view of one embodiment of a multi-chambered beverage brewing device 100, where the beverage extract formed in one of the ingredient extraction chambers 106 is filtered by filter media 108, prior to collecting in ingredient extraction collection chamber 110 and exiting the device 100 at extraction exit site 112 (not shown).

Figure 15:
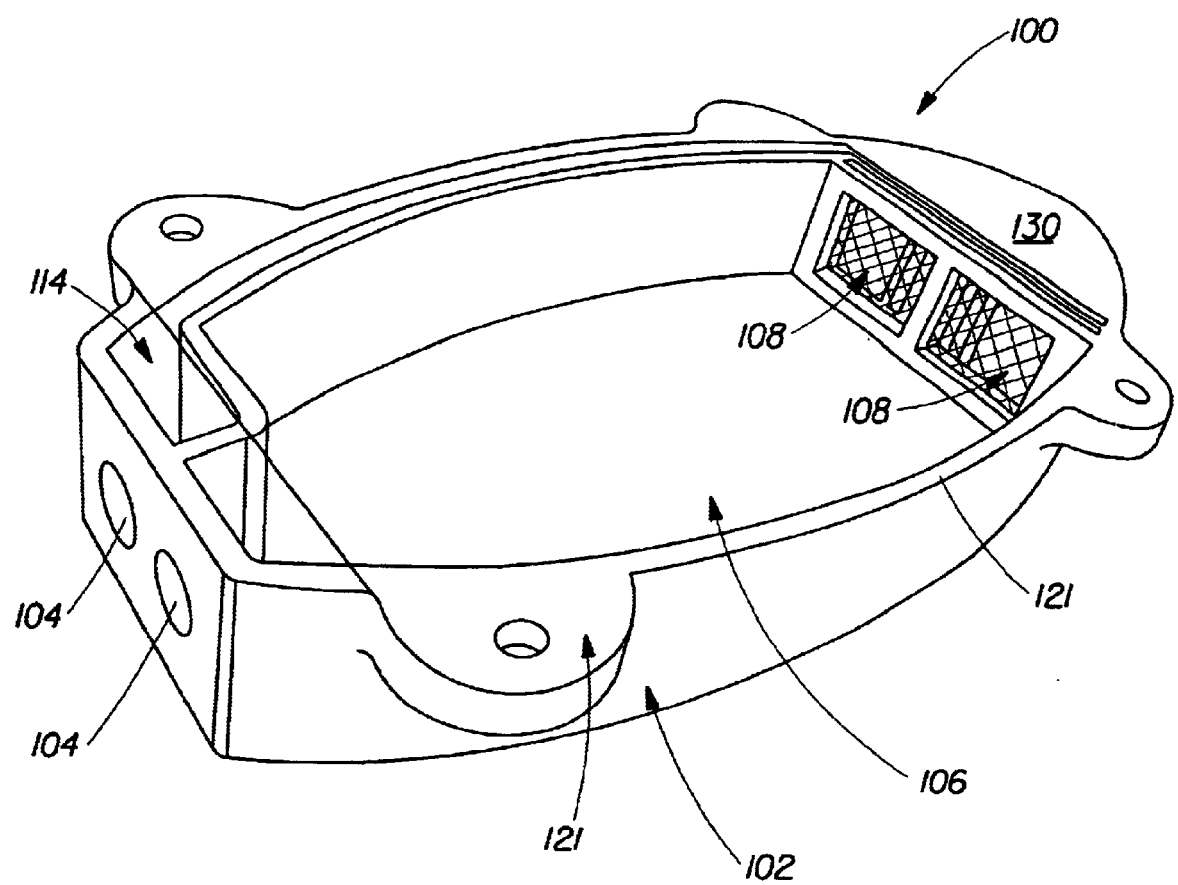
Figure 16:
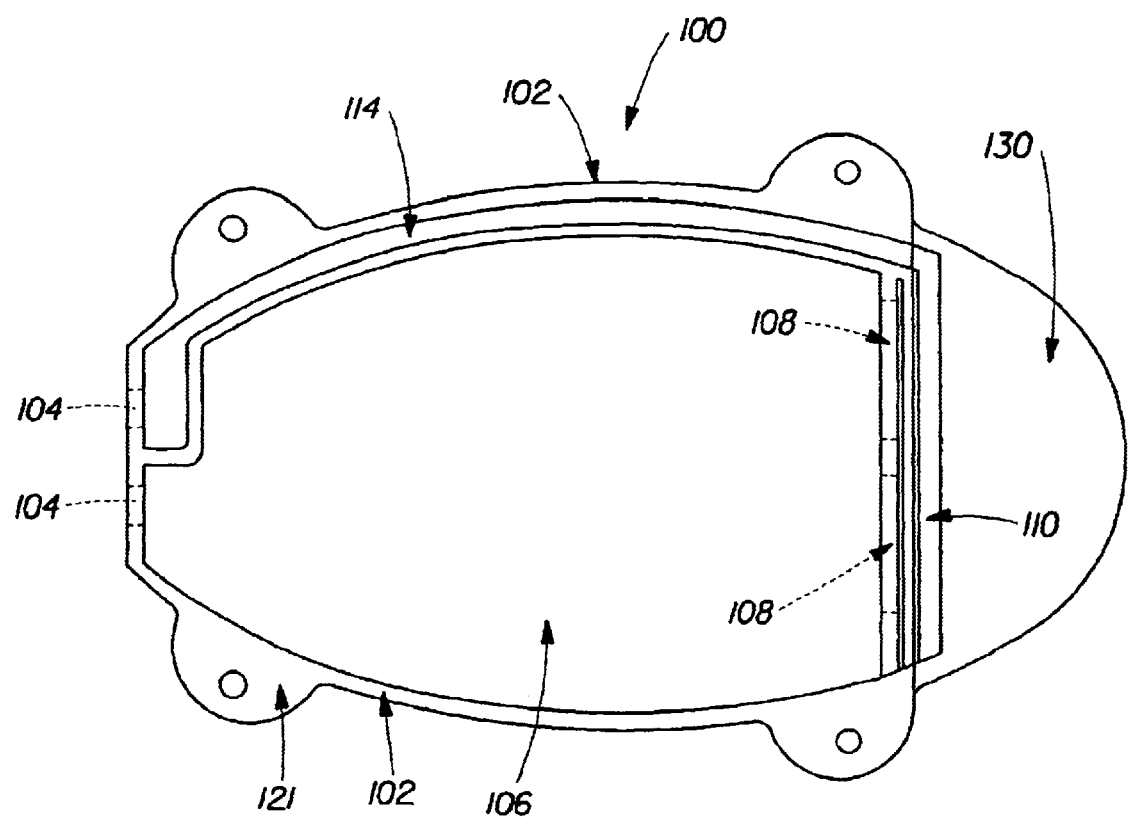
FIG. 16 is a top planar view of the embodiment of FIG. 15.
Figure 17A:
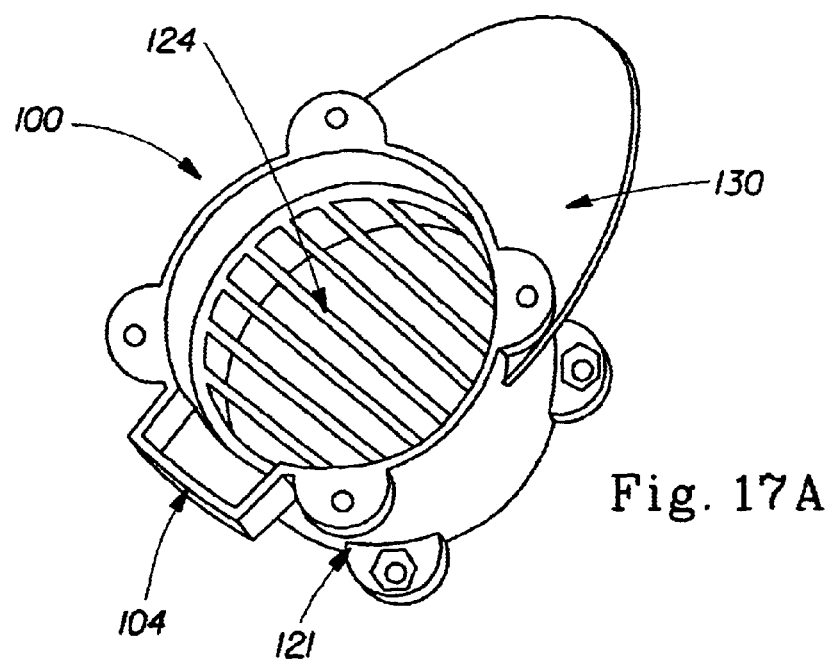
FIGS. 17A and 17B are perspective views of the interiors of one embodiment of a beverage brewing device.
Figure 17B:
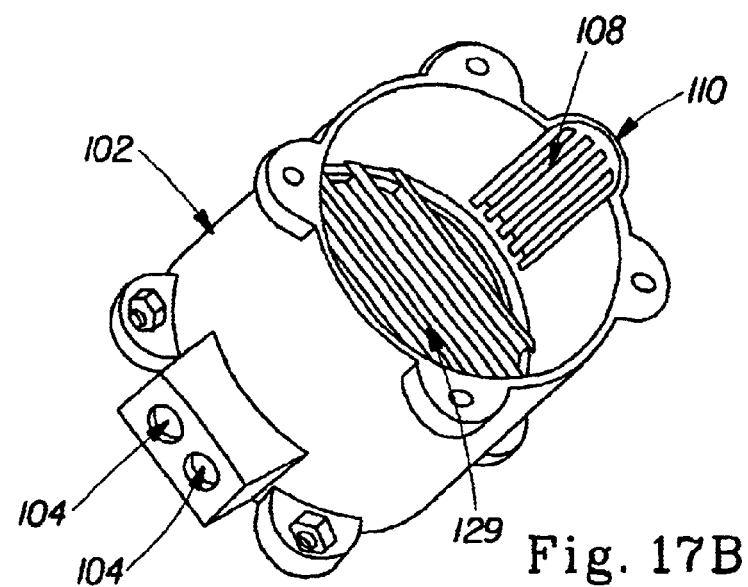

FIG. 15 is a perspective view of the interior of one embodiment of the present invention wherein the beverage brewing device 100 comprises one ingredient extraction chamber 100 and a fluid bypass conduit 114. FIG. 16 is the top planar view of the beverage brewing device 100 disclosed in FIG. 15. FIGS. 17A and 17B are perspective views of the interiors of one embodiment of a single ingredient extraction chamber 106 beverage brewing device 100. Proximately located between the ingredient extraction chamber 106 and the extraction collection chamber 108 is a filter media supporting member 124 for supporting filter media 108 (not shown).

E. Embodiments

The following examples further describe and demonstrate embodiments within the scope of the present invention. These examples are given solely for the purpose of illustration and are not to be construed as a limitation of the present invention, as many variations thereof are possible without departing from the invention's spirit and scope.

In one embodiment of the present invention, beverage brewing devices having one or more ingredient extraction chambers are described wherein at least one of the ingredient extraction chambers contains a composition comprising:

a) a first component selected from the group consisting of roast ground coffee, leaf tea, and mixtures thereof; and b) a second component selected from the group consisting of instant coffee, instant tea, cocoa, and mixtures thereof;

wherein the ratio of the first component to the second component is from about 4:1 to about 25:1, by weight.

In another embodiment of the present invention, beverage brewing devices having one or more ingredient extraction chambers are described wherein at least one of the ingredient extraction chambers contains a composition comprising:

a) a first component selected from the group consisting of roast ground coffee, leaf tea, and mixtures thereof;

b) a second component selected from the group consisting of instant coffee, instant tea, cocoa, and mixtures thereof; and c) a third component selected from the group consisting of creamers, sweeteners, flavorings, thickening agents, edible carriers, dyes, foaming agents, buffers, emulsifiers, processing aids, and mixtures thereof;

wherein the ratio of the first component to the second component is from about 1:25 to about 25:1, by weight.

In still another embodiment of the present invention, beverage brewing devices having one or more ingredient extraction chambers are described wherein at least one of the ingredient extraction chambers contains:

a) a first component selected from the group consisting of roast ground coffee, leaf tea, instant coffee, instant tea, cocoa, and mixtures thereof; and b) a second component which is a foaming component comprising one or more foaming agents.

In yet a further embodiment of the present invention, beverage brewing devices are described which comprise one or more ingredient extraction chambers wherein at least one of the ingredient extraction chambers comprises a composition comprising:

a) a first component selected from the group consisting of roast ground coffee, leaf tea, instant coffee, instant tea, cocoa, and mixtures thereof; and b) a second component which comprises three or more members selected from the group consisting of creamers, sweeteners, flavorings, thickening agents, edible carriers, dyes, foaming agents, buffers, emulsifiers, and processing aids.

Typically, the beverage brewing devices are disposable devices that are suitable for use in connection with a brewing system, such as a traditional coffee brewer or other systems described herein. As used herein, the term "disposable" with reference to a beverage brewing device means that the beverage brewing device is intended for single or other limited usage, such that the beverage brewing device is disposed of subsequent to using the device a single time or a minimal number times (usually no more than about three times). Most preferably, the beverage brewing device is intended for single use only. Wherein the beverage brewing device is intended for single use only, the brewing device is intended for disposal subsequent to the first use of the device.

The beverage brewing devices herein each comprise one or more ingredient extraction chambers. In a preferred variation herein, the beverage brewing devices of this invention contain only one or two ingredient extraction chambers. Most preferably, in each of the embodiments herein, the beverage brewing devices contain only one ingredient extraction chamber; however, in the first embodiment herein it is also preferred that the beverage brewing devices contain two ingredient extraction chambers. However, wherein the beverage brewing devices contain a plurality of ingredient extraction chambers, each ingredient extraction chamber may comprise the same, or different composition, relative to each remaining ingredient extraction chamber. Each ingredient extraction chamber may comprise a composition which is specifically described herein, a modification thereof, or a completely different composition, as long as at least one of the ingredient extraction chambers contains a composition which is specifically described herein.

It has been discovered that wherein the particle sizes of the foregoing component constituents are relatively similar, aqueous brewing fluid introduced into the ingredient extraction chamber contacts a relatively small percentage of the total component mass thereby creating a "channeling" effect rather than a turbulent, fluidized ingredient extraction process that is preferred for fluidized brewing. Wherein such undesirable channeling occurs, a relatively weak and/or unfavorably tasting beverage is produced. Additionally, adsorption of various component constituents onto roast ground coffee and leaf tea particles readily occurs, causing further problems with the final brewed beverage.

It has further been discovered that fluidized brewing and adsorption inhibition is optimized (which in turn optimizes flavor ingredient extraction) wherein the roast ground coffee and leaf tea utilized herein each, independently, preferably have a mean particle size of from about 650 microns to about 1050 microns, more preferably from about 750 microns to about 950 microns. It is particularly preferred to utilize roast ground coffee and/or leaf tea having a mean particle size of about 850 microns. Preferably, the roast ground coffee and/or leaf tea will have a particle size distribution of from about 300 microns to about 1750 microns, more preferably from about 600 microns to about 1400 microns. As used herein, wherein a particular ingredient has a given particle size distribution, it is meant that at least about 80% of the particles of that particular ingredient contained within the referenced ingredient extraction chamber are, by weight, within the stated particle size distribution. Without intending to be limited by theory, it is believed that optimization of the particle sizes of these ingredients positively contributes to the turbidity of the brew composition upon addition of the aqueous brewing fluid, such that channeling is prevented or inhibited, c.f., for example, EP 0,756,844, Gotham et al., published Feb. 5, 1997 which encourages the use of roast ground coffee having a relatively fine grind size for the purpose of ingredient extraction enhancement.

It has also been discovered that density of the constituents of the first component will also typically be important in the prevention or inhibition of channeling and adsorption since a distribution of constituent densities will also enhance turbulence and mixing in a given ingredient extraction chamber. Therefore, alternatively or additionally, the roast ground coffee and leaf tea utilized herein will each, independently, preferably have a mean density of from about 0.18 g/mL to about 0.24 g/mL, more preferably from about 0.2 g/mL to about 0.22 g/mL.

Use of larger, less dense roast and ground and tea particles, relative to the particle sizes and densities of the remaining ingredients, aides in the mixing of all ingredients. As the brewing fluid comes into initial contact with the non-tamped, dry bulk ingredients residing in the ingredient extraction chamber, the larger, less dense particles will tend to float to the surface from there location within the ingredient mixture. This floating action results in the creation of void pockets where the larger, less dense particles resided. These void pockets, it is believed, encourage greater ingredient-brewing fluid contact that result in higher degrees of extraction and/or solubilization.

The benefits of void pocket creation with respect to increased degrees of extraction and/or solubilization may also be employed, either independently or conjointly, by using ingredient particles (including agglomerations of ingredient particles), of sufficient size to create suitable void pockets, that exhibit higher rates of extraction and/or solubilization than the remaining ingredients. As these particles solubilize or are extracted they leave void pockets that aide in the extraction and/or solubilization of the remaining ingredients.

In this same respect, it has further been discovered that fluidized brewing and flavor ingredient extraction is optimized wherein the instant coffee, instant tea, and cocoa utilized herein each, independently, has a mean particle size of from about 500 microns to about 1000 microns, more preferably from about 700 to about 900 microns. Also preferably, the instant coffee, instant tea, and/or cocoa will have a particle size distribution of from about 150 microns to about 1700 microns. As used herein, wherein a particular ingredient has a given particle size distribution, it is meant that at least about 80% of the particles of that particular ingredient contained within the referenced ingredient extraction chamber are, by weight, within the stated particle size distribution. Additionally or alternatively, the instant coffee, instant tea, and cocoa utilized herein will each, independently, preferably have a mean density of from about 0.05 g/mL to about 0.3 g/mL, more preferably from about 0.1 g/mL to about 0.25 g/mL.

First Embodiment of the Present Beverage Brewing Devices

In the first embodiment of the present invention, beverage brewing devices having one or more ingredient extraction chambers are described wherein at least one of the ingredient extraction chambers contains a composition comprising:
  a) a first component selected from the group consisting of roast ground coffee, leaf tea, and mixtures thereof; and
  b) a second component selected from the group consisting of instant coffee, instant tea, cocoa, and mixtures thereof;
wherein the ratio of the first component to the second component is from about 4:1 to about 25:1, by weight.

In accordance with this embodiment, it has been discovered that wherein the specified amount of second component is added to the composition, relative to the amount of the first component, the properties of the composition as a whole are optimized for use in disposable beverage brewing devices. In particular, wherein roast ground coffee is utilized alone in an ingredient extraction chamber herein, a "channeling" effect results when the aqueous brewing fluid (e.g., hot water) is introduced, rather than a more desirable turbulent, fluidized ingredient extraction process. Additionally, the undesirable adsorption of various ingredients onto, for example, coffee particles is diminished.

The inventors have discovered that the channeling and adsorption effects are optimally overcome wherein the ratio of the first component to the second component is from about 4:1 to about 25:1, by weight. Preferably, inhibition of the channeling effect is optimized wherein the first component and the second component have particle sizes and densities conforming with the preferred ranges set forth above (for example, roast ground coffee having a mean particle size of about 800 microns and instant coffee having a particle size distribution of from about 100 microns to about 1700 microns). Without intending to be limited by theory, it is believed that the resulting variable densities of the each of the individual components, and the resulting porosities of the components, positively influence the fluidity of the composition when an aqueous brewing fluid is introduced.

Preferably in this embodiment, the ratio of the first component to the second component is from about 4:1 to about 10:1, by weight. Most preferably in this embodiment, the ratio of the first component to the second component is from about 4:1 to about 7:1, by weight. In a particularly preferred embodiment, the ratio of the first component to the second component is about 6:1, by weight.

Also preferably in this embodiment, the first component is preferably roast ground coffee. Further preferably, the second component is selected from instant coffee, cocoa, and mixtures thereof. Therefore, in preferred embodiments, the second component will comprise instant coffee and/or cocoa. In yet other preferred embodiments, therefore, the second component will be instant coffee, cocoa, or a mixture thereof.

Also preferably in this embodiment, wherein the first component comprises roast ground coffee, the composition contained within the ingredient extraction chamber contains from about 0.001% to about 35% of the roast ground coffee, more preferably from about 20% to about 35% of the roast ground coffee, and most preferably from about 20% to about 30% of the roast ground coffee, all by weight of the composition. Wherein the second component comprises instant coffee, the composition contained within the ingredient extraction chamber contains from about 0.001% to about 30% of the instant coffee, more preferably from about 1% to about 15% of the instant coffee, and most preferably from about 1% to about 6% of the instant coffee, all by weight of the composition.

It is important to understand that ingredient extraction chambers described in this embodiment of the present invention may contain one or more further ingredients for further optimized customization including (for example) creamers, sweeteners, flavorings, thickening agents, edible carriers, foaming agents, dyes, buffers, emulsifiers, processing aids, or mixtures thereof. One or more of these further ingredients may be contained within an ingredient extraction chamber containing, or devoid of, the first and second components of this embodiment.

Additionally, further ingredient extraction chambers may be utilized in the beverage brewing device having a variety of ingredients contained therein, for example, roast ground coffee, instant coffee, leaf tea, instant tea, creamers, sweeteners, flavorings, thickening agents, edible carriers, dyes, buffers, emulsifiers, processing aids, or mixtures thereof. For example, one or more of these further ingredients may be contained within an ingredient extraction chamber devoid of the first and second components of this embodiment.

Second Embodiment of the Present Beverage Brewing Devices

The second embodiment of the present invention is a result of the discovery that the ratio of the roast ground coffee and/or leaf tea to the instant coffee, instant tea, and/or cocoa, may be further modified wherein a further ingredient is added to the composition. In particular, less instant coffee, instant tea, and/or cocoa may be utilized relative to the roast ground coffee and/or leaf tea. Additionally, while the ratios are still important (as discovered and described herein), the ratios are more variable wherein the further ingredient is added. Without intending to be limited by theory, it is believed that addition of one or more such further ingredients enhances the variability of the particles in the total composition, thereby resulting in a diverse mixture more susceptible to fluidization during the brewing process. Additionally, wherein the roast ground coffee and/or leaf tea to the instant coffee, instant tea, and/or cocoa as defined in this embodiment is utilized, adsorption of further ingredients such as creamers is minimized. As a result, a higher quality final brewed beverage is provided.

In particular, in accordance with the second embodiment of this invention, beverage brewing devices are provided which comprise one or more ingredient extraction chambers wherein at least one of the ingredient extraction chambers contains a composition comprising:

a) a first component selected from the group consisting of roast ground coffee, leaf tea, and mixtures thereof;

b) a second component selected from the group consisting of instant coffee, instant tea, cocoa, and mixtures thereof; and c) a third component selected from the group consisting of creamers, sweeteners, flavorings, thickening agents, edible carriers, dyes, foaming agents, buffers, emulsifiers, processing aids, and mixtures thereof;

wherein, as has been discovered herein, the ratio of the first component to the second component is from about 1:25 to about 25:1, by weight. Preferably, as discovered herein, this ratio of the first component to the second component is from about 1:2 to about 15:1, by weight. Most preferably, this ratio of the first component to the second component is from about 1:1 to about 10:1.

Also preferably in this embodiment, the first component is roast ground coffee. Further preferably, the second component is selected from instant coffee, cocoa, and mixtures thereof. Therefore, in preferred embodiments, the second component will comprise instant coffee and/or cocoa. In yet other preferred embodiments, therefore, the second component will be instant coffee, cocoa, or a mixture thereof. The first and second components will preferably have the optimized particle size and density ranges and distributions described herein above.

Also preferably in this embodiment, the third component is comprises one or more members selected from creamers, sweeteners, flavorings, thickening agents, edible carriers, foaming agents, buffers, emulsifiers, processing aids, and mixtures thereof. More preferably, the third component comprises one or more members selected from creamers, sweeteners, flavorings, and foaming agents.

Consistent with the present discovery, at least one member of the third component has a mean particle size of from about 200 microns to about 500 microns and a mean density of from about 0.1 g/mL to about 0.5 g/mL. Also preferably, at least one member of the third component will have a particle size distribution of from about 100 microns to about 1000 microns. As used herein, wherein a particular ingredient has a given particle size distribution, it is meant that at least about 80% of the particles of that particular ingredient contained within the referenced ingredient extraction chamber are, by weight, within the stated particle size distribution.

In particular, wherein creamer is utilized as a member of the third component, it is preferred that such creamer has a mean particle size of from about 200 microns to about 300 microns and a mean density of from about 0.3 g/mL to about 0.5 g/mL. Non-limiting examples of such commercially available creamers include 50% Soybean Oil Non-dairy Creamers Dean Foods Custom Crème or Kerry Kreme from Kerry Ingredients.

Also, wherein foaming creamer is utilized as a member of the third component, it is preferred that such foaming creamer has a mean particle size of from about 400 microns to about 600 microns and a mean density of from about 0.1 g/mL to about 0.22 g/mL. Non-limiting examples of such commercially available foaming creamers include Dean Foods Foaming Cremre, Kerry KocoKreme, DMV Cappuccino Foamers, and Deihl Inc. Coco Rich Foamers.

Also preferably in this embodiment, wherein the first component comprises roast ground coffee, the composition contained within the ingredient extraction chamber contains from about 0.001% to about 35% of the roast ground coffee, more preferably from about 20% to about 35% of the roast ground coffee, and most preferably from about 20% to about 30% of the roast ground coffee, all by weight of the composition. Wherein the second component comprises instant coffee, the composition contained within the ingredient extraction chamber contains from about 0.001% to about 30% of the instant coffee, more preferably from about 1% to about 15% of the instant coffee, and most preferably from about 1% to about 6% of the instant coffee, all by weight of the composition.

Additionally, further ingredient extraction chambers may be utilized in the beverage brewing device having a variety of ingredients contained therein, for example, roast ground coffee, instant coffee, leaf tea, instant tea, creamers, sweeteners, flavorings, thickening agents, edible carriers, dyes, buffers, emulsifiers, processing aids, or mixtures thereof. For example, one or more of these further ingredients may be contained within an ingredient extraction chamber devoid of the first and second components of this embodiment.

Third Embodiment of the Present Beverage Brewing Devices

In still another embodiment of the present invention, beverage brewing devices having one or more ingredient extraction chambers are described wherein at least one of the ingredient extraction chambers contains:

a) a first component selected from the group consisting of roast ground coffee, leaf tea, instant coffee, instant tea, cocoa, and mixtures thereof; and b) a second component which is a foaming component comprising one or more foaming agents.

Preferably, the first component is selected from roast ground coffee, instant coffee, cocoa, and mixtures thereof. Particularly preferred embodiments include mixtures of roast ground coffee and instant coffee, as well as mixtures of roast ground coffee, instant coffee, and cocoa.

Preferably in this embodiment, in order to inhibit channeling and enhance fluidized brewing (as described herein above), the ratio of any roast ground tea and leaf tea to any instant coffee, instant tea, and cocoa is from about 1:25 to about 25:1, by weight, more preferably from about 1:1 to about 25:1, by weight, and most preferably from about 1:1 to about 10:1, by weight.

Preferably in this embodiment, wherein the first component comprises roast ground coffee, the composition contained within the ingredient extraction chamber contains from about 0.001% to about 35% of the roast ground coffee, more preferably from about 20% to about 35% of the roast ground coffee, and most preferably from about 20% to about 30% of the roast ground coffee, all by weight of the composition. Wherein the first component comprises instant coffee, the composition contained within the ingredient extraction chamber contains from about 0.001% to about 30% of the instant coffee, more preferably from about 1% to about 15% of the instant coffee, and most preferably from about 1% to about 6% of the instant coffee, all by weight of the composition.

The second component used herein is a foaming component comprising one or more foaming agents. A variety of foaming agents may be utilized herein to provide foam without the need for mechanical needs such as whipping devices. As used herein, the term "foam" refers to a light frothy mass formed in or on the surface of the brewed beverage (for example, coffee or hot chocolate). Foaming agents, including preferred foaming agents and amounts thereof, are described herein further below.

Additionally, further ingredient extraction chambers may be utilized in the beverage brewing device having a variety of ingredients contained therein, for example, roast ground coffee, instant coffee, leaf tea, instant tea, creamers, sweeteners, flavorings, thickening agents, edible carriers, dyes, buffers, emulsifiers, processing aids, or mixtures thereof. For example, one or more of these further ingredients may be contained within an ingredient extraction chamber devoid of the first and second components of this embodiment.

Fourth Embodiment of the Present Invention

In yet a further embodiment of the present invention, beverage brewing devices are described which comprise one or more ingredient extraction chambers wherein at least one of the ingredient extraction chambers comprises a composition comprising:

a) a first component selected from the group consisting of roast ground coffee, leaf tea, instant coffee, instant tea, cocoa, and mixtures thereof; and b) a second component which comprises three or more members selected from the group consisting of creamers, sweeteners, flavorings, thickening agents, edible carriers, dyes, foaming agents, buffers, emulsifiers, and processing aids.

In accordance with this embodiment, the present inventors have discovered that fluidization of the total composition within the ingredient extraction chamber is optimized wherein a wide variety of ingredients are included. Thus, the second component serves to introduce three or more members which will, by definition, have varied characteristics thereby allowing fluidization in the ingredient extraction chamber upon entry of an aqueous brewing fluid. This way, most or all of the ingredients are accessed which, in turn, provides a beverage having high quality flavor. C.f., for example, EP 0,756,844, Gotham et al., published Feb. 5, 1997 which discourages inclusion of coffee and a creamer, sweetener, foam stabilizer, and/or flavor within the same composition.

Preferably, the first component is selected from roast ground coffee, instant coffee, cocoa, and mixtures thereof. Particularly preferred embodiments include mixtures of roast ground coffee and instant coffee, as well as mixtures of roast ground coffee, instant coffee, and cocoa. It is also preferred wherein the first component is roast ground coffee or instant coffee, but not both.

Preferably in this embodiment, the ratio of any roast ground tea and leaf tea to the any instant coffee, instant tea, and cocoa is from about 1:25 to about 25:1, by weight, more preferably from about 1:1 to about 25:1, by weight, and most preferably from about 1:1 to about 10:1, by weight.

Preferably in this embodiment, wherein the first component comprises roast ground coffee, the composition contained within the ingredient extraction chamber contains from about 0.001% to about 35% of the roast ground coffee, more preferably from about 20% to about 35% of the roast ground coffee, and most preferably from about 20% to about 30% of the roast ground coffee, all by weight of the composition. Wherein the first component comprises instant coffee, the composition contained within the ingredient extraction chamber contains from about 0.001% to about 30% of the instant coffee, more preferably from about 1% to about 15% of the instant coffee, and most preferably from about 1% to about 6% of the instant coffee, all by weight of the composition.

Also preferably, three or more of the members are selected from creamers, sweeteners, flavorings, thickening agents, edible carriers, foaming agents, buffers, emulsifiers, and processing aids. In a particularly preferred embodiment, at least three of the members are creamer, sweetener, and flavoring.

F. Components and Ingredients Contained within the Ingredient Extraction Chambers Various components and ingredients have been described above in connection with the ingredient extraction chambers of the foregoing beverage brewing devices, for example, roast ground coffee, leaf tea, instant coffee, instant tea, cocoa, creamers, sweeteners, flavorings, thickening agents, edible carriers, dyes, foaming agents, buffers, emulsifiers, and processing aids. Wherein these components and ingredients are not required element of the invention, they may be optionally utilized and contained within the same ingredient extraction chamber as the described composition, or in a different ingredient extraction chamber.

While these components and ingredients carry their respective meanings in accordance with the art, and are well-known, the following describes their characteristics in further, non-limiting, detail. It is noted that foaming agents have been described above in particular detail with respect to the third embodiment of this invention; the same foaming agents may optionally be utilized in the first and second embodiments and are not reiterated below.

Various other ingredients not mentioned specifically herein may be suitable and/or desirable for use herein, as the ordinarily skilled artisan will recognize. Therefore, the following list is not meant to be limiting.

Roast Ground Coffee: The roast ground coffee utilized herein is commonly known in the art, and is a widely utilized (if not the most widely utilized) form of coffee. Of course, processes for roasting and grinding coffee are commonly known in the art. Additionally, the roast ground coffee is commercially available from a variety of commercial coffee houses.

Typically, roast ground coffee is prepared by drying the green coffee beans, roasting the beans, cooling the roasted beans, and grinding the beans (typically, although not always, in that sequential order). As an example, U.S. Pat. No. 5,160,757, Kirkpatrick et al., issued Nov. 3, 1992 describes a unique process for preparing roast ground coffee, and also summarizes commonly known processes for preparing roast ground coffee.

The bean utilized may be any of a variety of available coffee beans. For example, Brazilian, natural Arabica, washed Arabica, and Robusta varieties may be used.

Drying the coffee bean results in a partially or fully dehydrated bean (preferably partially dehydrated). Such drying typically involves the application of heat and moisture removal to the green coffee bean. Moisture removal can be accomplished by, for example, dehydration, heated air, heated surfaces, microwave, dielectric, radiant, or freeze dryers. These drying techniques are described in Fellows, *Food Processing Technology*, Chapters 14, 17, and 20. Fluidized bed heated air dryers (e.g., batch or continuous), rotary dryers, belt dryers, tray dryers, continuous dryers, and conveyor and convective dryers are particularly preferred. All of these dryers are commercially available. For example, various commercial sources are described in U.S. Pat. No. 5,160,757, Kirkpatrick et al., issued Nov. 3, 1992.

The roasting process can utilize any method of heat transfer. For example, convective heat transfer is typical. Roasting equipment and methods suitable for roasting coffee beans are described in, for example, Sivetz, *Coffee Technology*, Avi Publishing Co., 1979. Additionally, U.S. Pat. No. 3,964,175, Sivetz, issued Jun. 22, 1976 discloses a method for fluidized bed roasting of coffee beans. Other roasting techniques are described and referenced in U.S. Pat. No. 5,160,757, Kirkpatrick et al., issued Nov. 3, 1992.

Roasting may be applied until the desired roast bean color is reached. The beans are then cooled to stop roast-related pyrolysis reactions. The beans are then prepared for brewing, either on site or by the ultimate consumer, by grinding. Preferred grinding techniques result in a mean particle size of from about 300 microns to about 3000 microns. Particularly preferred mean particle sizes are described herein above.

As used herein, roast ground coffee also refers to "flaked" coffees. Flaked coffee is described in U.S. Pat. Nos. 4,331,696; 4,267,200; 4,110,485; 3,660,106; 3,652,293; and 3,615,667.

Leaf Tea: The leaf tea utilized herein is commonly known in the art, and is a widely utilized form of tea. Leaf tea is typically utilized after drying the desired tea leaf, as is commonly known in the art. Currently leaf tea is commercially available, for example, as loose leaf tea (for use in tea brewing devices) or marketed within brewable tea bags or other brewing devices. Leaf tea is commercially available from a variety of commercial sources.

Instant Coffee: As used herein, the terms "instant coffee" and "soluble coffee" are used interchangeably to refer to coffee products that are relatively soluble in water, particularly hot water. Instant coffees are widely known in the art.

The instant coffee used utilized herein can be prepared by any convenient process. A variety of such processes are known to those skilled in the art. Typically, instant coffee is prepared by roasting and grinding coffee beans, extracting the roast and ground coffee with water or another aqueous liquid to form an aqueous coffee extract, and drying the extract to form the instant coffee. Instant coffee useful in the present invention is typically obtained by conventional spray drying processes. Representative spray drying processes that can provide suitable instant coffee are disclosed in, for example, pages 382–513 of Sivetz & Foote, Coffee Processing Technology, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949. Other suitable processes for providing instant coffee for use in the present invention are disclosed in, for example, U.S. Pat. No. 3,436,227 (Bergeron et al.), issued Apr. 1, 1969; U.S. Pat. No. 3,493,388 (Hair), issued Feb. 3, 1970; U.S. Pat. No. 3,615,669 (Hair et al.), issued Oct. 26, 1971; U.S. Pat. No. 3,620,756, (Strobel et al.), issued Nov. 16, 1971; and U.S. Pat. No. 3,652,293 (Lombana et al.), issued Mar. 28, 1972. In addition to spray dried instant coffee, instant coffee useful in the present invention can include freeze-dried coffee, which is also widely known in the art. The instant coffee may be prepared from any single variety of coffees or a blend of different varieties, depending upon the final instant coffee desired. The instant coffee may be decaffeinated or undecaffeinated and may be processed to reflect a unique flavor characteristic such as espresso, "French Roast," and the like.

Instant Tea: As used herein, the terms "instant tea" and "soluble tea" are used interchangeably to refer to tea products that are relatively soluble in water, particularly hot water. Instant teas are widely known in the art. Instant teas may be prepared in a similar manner relative to instant coffees. For example, instant tea may be prepared by extracting leaf tea with water or another aqueous liquid to form an aqueous tea extract, and drying the extract to form the instant tea. Instant teas are widely commercially available.

Cocoa: The cocoa utilized herein is commonly known in the art. For example, the cocoa may be natural or "Dutch" chocolate, or washed or fermented cocoa, from which a substantial portion of the fat or cocoa butter has been expressed or removed by solvent ingredient extraction, by pressing, or by other well-known and suitable means.

Cocoa suitable for use in the present invention may optionally contain from about 0.5% to about 20% fatty constituents. Dutch chocolate is prepared by treating cocoa nibs with alkaline material such as potassium carbonate in a manner well known in the art. Generally, Dutch cocoa tends to have a darker color and can also be more flavorful than natural cocoas. Fermented cocoa powder can also be used in the present invention. This cocoa is prepared by fermenting green cocoa beans before roasting and milling. The fermentation is usually conducted by soaking the green beans in water for about a week followed by drying the beans.

Chocolate can be used as the cocoa source in the present invention and it is intended, therefore, that chocolate, as described above, be encompassed by the term "cocoa." When chocolate is used, it is preferably in a finely divided form. The cocoa is also preferably heat-treated for sterilization. Any conventional pasteurization oven or pasteurization equipment for solids can be used to sterilize the cocoa. Heating the cocoa to about 110° C. for up to about 3 hours is usually sufficient to kill bacteria, yeasts and molds.

Creamers: Various creamers may be utilized herein. Commercial creamers are readily available, and are readily chosen by those of ordinary skill in the art. Prepared creamers generally comprise fat, emulsifiers, and processing aids; accordingly, depending on the composition of the particular creamer chosen, all or part of any fat, emulsifier or processing aid used in the composition are contributed by the creamer.

Non-limiting examples of suitable creamers for use in the present invention include, for example, dairy creamers, non-dairy creamers, synthetic and imitation dairy products, low-fat, non-fat, and whole milk solids, butterfat solids, dry mixes used to prepared ice cream, milkshakes, frozen desserts, and mixtures thereof. The creamer may be made from a variety of fats and oils including soybean and partially hydrogenated soybean oil, partially hydrogenated canola oil, hydrogenated and partially hydrogenated coconut oil, as well as other hydrogenated vegetable oils, or combinations of such oils. Preferred creamers include non-dairy creamers made from vegetable oils, carbohydrates, sodium caseinate or other proteins, and buffers. Additional creamers suitable for use in the present invention include those synthetic and imitation dairy products disclosed in Kirk Othmer Encyclopedia of Chemical Technology, W. J. Harper, Willey Interscience, 3rd edition, Vol. 22, section entitled "Synthetic and Imitation Dairy Products," pp. 465–498 (1978).

Both foaming and non-foaming creamers can be utilized herein. Foaming creamers suitable for use in the present invention can comprise a non-dairy fat (e.g., partially hydrogenated oil), a water-soluble non-dairy carbohydrate (e.g., sucrose, dextrose, maltose, corn syrup solids and mixtures thereof), a buffer, a proteinaceous foam stabilizing agent (e.g., sodium caseinate) and optionally a gum thickener. These solid components may be mixed with water and then homogenized. A gas (e.g., nitrogen) may be injected or blended into this mixture and the mixture spray-dried to provide the foaming creamer. See, e.g., U.S. Pat. No. 4,438,147 (Hedrick), issued Mar. 20, 1984; and U.S. Pat. No. 5,462,759 (Westerbeek et al.), issued Oct. 31, 1995. Non-foaming creamers suitable for use in the present invention have an ingredient composition similar to that of the foaming creamers but without the incorporated gas. Also, foaming creamers typically have more proteinaceous components (typically about 12% to about 13% of total creamer) relative to non-foaming non-dairy creamers (typically about 3.5% of total creamer).

It is particularly preferred that the non-foaming creamer has a mean particle size of from about 200 microns to about 300 microns and a mean density of from about 0.3 g/mL to about 0.5 g/mL. Non-limiting examples of such commercially available creamers include 50% Soybean Oil Non-dairy Creamers Dean Foods Custom Crème or Kerry Kreme from Kerry Ingredients.

Also, it is particularly preferred that the non-foaming creamer has a mean particle size of from about 400 microns to about 600 microns and a mean density of from about 0.1 g/mL to about 0.22 g/mL. Non-limiting examples of such commercially available foaming creamers include Dean Foods Foaming Cremre, Kerry KocoKreme, DMV Cappuccino Foamers, and Deihl Inc. Coco Rich Foamers.

Preferably, wherein a given composition comprises one or more creamers, the composition comprises from about 1% to about 90% of the total creamer, more preferably from about 10% to about 90% of the total creamer, even more preferably from about 20% to about 70% of the total creamer and most preferably from about 40% to about 60% of the total creamer, all by weight of the composition. These amounts include any foaming creamer present in the composition; preferred amounts of foaming creamer, itself, are set forth above in the discussion of foaming agents.

Sweeteners: One or more sweeteners are often utilized herein. Preferred sweeteners for use in the present invention are sugars and sugar alcohols such as sucrose, fructose, dextrose, maltose, lactose, high fructose corn syrup solids, invert sugars, sugar alcohols, including sorbitol, as well as mixtures of these sugars and sugar alcohols. In order to deliver lower levels of solids per dosage, it is particularly preferred to use a higher intensity sweetener with the sugar or sugar alcohol. These higher intensity sweeteners include, for example, saccharin, cyclamates, acesulfame K (for example, SUNETTE), L-aspartyl-L-phenylalanine lower alkyl ester sweeteners (e.g., aspartame); L-aspartyl-D-alanine amides disclosed in U.S. Pat. No. 4,411,925 to Brennan et al; L-aspartyl-D-serine amides disclosed in U.S. Pat. No. 4,399,163 to Brennan et al; L-aspartyl-L-1-hydroxymethylalkaneamide sweeteners disclosed in U.S. Pat. No. 4,338,346 to Brand; L-aspartyl-1-hydroxyethylalkaneamide sweeteners disclosed in U.S. Pat. No. 4,423,029 to Rizzi; and L-aspartyl-D-phenylglycine ester and amide sweeteners disclosed in European Patent Application 168,112 to Janusz, published Jan. 15, 1986. Particularly preferred include aspartame and acesulfame K. A particularly preferred sweetener system is a combination of sucrose with aspartame and acesulfame K. This mixture not only enhances sweetness, but also lowers the level of solids that is delivered in preparing the final beverage product.

Preferably, wherein one or more sweeteners is contained within a composition, the composition comprises from about 0.001% to about 60% of the total sweetener, more preferably from about 5% to about 40% of the total sweetener, even more preferably from about 5% to about 25% of the total sweetener, and most preferably from about 7% to about 15% of the total sweetener.

Flavoring Agents: The flavoring agents useful herein include any one of the commercially available non-coffee, non-tea, and non-cocoa flavors (coffee, tea, and cocoa flavors may be provided by the coffees, tea, and cocoas, respectively, described herein). Preferably, such flavoring agents are sourced from encapsulated or liquid flavors. These flavoring agents may be natural or artificial flavors. Preferred flavoring agents include almond nut, amaretto, anisette, brandy, cappuccino, mint, cinnamon, cinnamon almond, creme de menthe, grand mariner, peppermint, pistachio, sambuca, apple, chamomile, cinnamon spice, creme, vanilla, french vanilla, Irish creme, kahlua, lemon, macadamia nut, orange, orange leaf, peach, strawberry, grape, raspberry, cherry, and the like, aroma enhancers such as acetaldehyde, herbs, spices, as well as mixtures of these foregoing flavoring agents.

Thickening Agents: One or more thickening agents may also be selected for use herein. Thickening agents are useful for enhancing the body and mouthfeel characteristics of the final beverage product, as well as aiding to prevent sedimentation of the product when reconstituted, particularly wherein cocoa is utilized.

Thickening agents are well-known in the art. Non-limiting examples of thickening agents include, for example, natural and synthetic gums such as locust bean gum, guar gum, gellan gum, xanthan gum, gum ghatti, modified gum ghatti, tragacanth gum, carrageenan, and anionic polymers derived from cellulose such as carboxymethylcellulose, sodium carboxymethylcellulose, and cellulose gel (for example, AVICEL). Additionally, suitable starches include, but are not limited to, pregelatinized starch (e.g., corn, wheat, or tapioca), pregelatinized high amylose content starch, pregelatinized hydrolyzed starches (maltodextrins, corn syrup solids), chemically modified starches such as pregelatinized substituted starches (e.g., octenyl succinate modified starches such as N-Creamer, N-Lite LP, TEXTRA, commercially available from National Starch), as well as mixtures of these starches.

It is particularly preferred that thickening agents be predominantly made from starches and that no more than about 20%, most preferably no more than about 10%, of the thickening agent is comprised of gums. These thickening agents can also be incorporated, for example, as part of the edible carrier for an emulsified fat on a spray dried non-foaming creamer.

Preferably, wherein a given composition contains one or more thickening agents, the composition comprises from about 0.001% to about 15% of the total thickening agent, more preferably from about 0.05% to about 10% of the total thickening agent, and most preferably from about 0.1% to about 5% of the total thickening agent.

Edible Carriers: One or more edible carriers may be utilized herein, particularly as bulking agents or for other common uses. Suitable edible carriers for use herein include any of a variety of conventional solid materials that are suitable for use in edible products. Preferably, the carrier does not impart any undesirable off-flavors.

Non-limiting examples of preferred edible carriers include starches such as corn starch and potato starch, derivatives of starch such as dextrin and maltodextrin, cellulose and its derivatives, such as sodium carboxymethylcellulose, ethyl cellulose, and cellulose acetate, malt, gelatin, and sugars and sugar alcohols.

Dyes: Suitable dyes suitable for use herein may be any of a variety of food grade dyes such as FD&C Red #40, FD&C Red Lake #40, FD&C Yellow #5, FD&C Yellow Lake #5, FD&C Yellow #6, Blue #1, Natural Caramel Colorant, N&A Chocolate Dye, as well as mixtures of dyes.

Foaming Agents: Although foaming agents have not previously been utilized in the context of the beverage brewing devices of the present invention, foaming agents per se are well-known. Foaming agents are desirable for providing a froth in or on the surface of a beverage, such as a coffee, tea, and/or cocoa beverage. For example, foaming agents are described in Villagran et al., U.S. Pat. No. 6,048,567, issued Apr. 11, 2000.

Preferred foaming agents are selected from foaming creamers, edible acids, edible bases, and mixtures thereof. In a preferred embodiment of the present invention, the foaming agent is one or more foaming creamers. In another preferred embodiment of the present invention, the foaming agent is a mixture of one or more edible acids and one or more edible bases. In yet another preferred embodiment of the present invention, the foaming agent is a mixture of one or more foaming creamers, one or more edible acids, and one or more edible bases.

Foaming creamers are well-known. Commercial creamers are readily available, and are readily chosen by those of ordinary skill in the art. Prepared creamers generally comprise fat, emulsifiers, and processing aids; accordingly, depending on the composition of the particular creamer chosen, all or part of any fat, emulsifier or processing aid used in the composition are contributed by the creamer.

Non-limiting examples of suitable creamers for use in the present invention include, for example, dairy creamers, non-dairy creamers, synthetic and imitation dairy products, low-fat, non-fat, and whole milk solids, butterfat solids, dry mixes used to prepared ice cream, milkshakes, frozen desserts, and mixtures thereof. The creamer may be made from a variety of fats and oils including soybean and partially hydrogenated soybean oil, partially hydrogenated canola oil, hydrogenated and partially hydrogenated coconut oil, as well as other hydrogenated vegetable oils, or combinations of such oils. Preferred creamers include non-dairy creamers made from vegetable oils, carbohydrates, sodium caseinate or other proteins, and buffers. Additional creamers suitable for use in the present invention include those synthetic and imitation dairy products disclosed in Kirk Othmer Encyclopedia of Chemcial Technology, W. J. Harper, Willey Interscience, 3rd edition, Vol. 22, section entitled "Synthetic and Imitation Dairy Products," pp. 465–498 (1978).

To form the foaming creamer from one or more of the foregoing creamers, one or more of the creamers are injected or blended with a gas (e.g., nitrogen) and spray dried. See e.g., U.S. Pat. No. 4,438,147, Hedrick, issued Mar. 20, 1984 and U.S. Pat. No. 5,462,759 Westerbeek et al., issued Oct. 31, 1995. Upon dissolution of the foaming creamer, the gas is released thereby creating the foam or froth.

One or more edible acids may also be utilized as part of the foaming agent. Edible acids are widely used in the art and are widely commercially available. Non-limiting examples of suitable acids include citric acid, malic acid, tartaric acid, fumaric acid, succinic acid, phosphoric acid, as well as mixtures of these acids. Citric and/or malic acid are particularly preferred for use herein.

One or more edible bases are preferably utilized in combination with the edible acid. Such bases are utilized such that, upon reaction with one or more of the foregoing acids, gas (e.g., carbon dioxide) is produced which thereby creates the foam or froth. Non-limiting examples of suitable bases include carbonates and/or bicarbonates such as, for example, sodium bicarbonate, sodium carbonate, sodium bicarbonate, potassium bicarbonate, as well as mixtures of these salts. Sodium carbonate and sodium bicarbonate are particularly preferred wherein they are utilized in combination with citric acid. For example, the reaction between the sodium carbonate or bicarbonate with the citric acid may stabilize any proteinaceous foam stabilizer (as described herein below) such as sodium caseinate when the beverage is brewed.

Preferably, at least one of the foaming agents is physically associated with a coating agent. By "physically associated" it is meant that the coating agent encapsulates, or agglomerates with, the foaming agent. Thus, "physically associated" does not refer to a covalent linkage, but rather physical contact between the foaming agent and the coating agent. This embodiment is particularly preferred since it has been discovered that, upon brewing the beverage using the present beverage brewing device, the foaming agent is predisposed to creating foam prematurely within one or more chambers of the brewing device upon introduction of the aqueous liquid. In such case, wherein the foam is created in the chamber, it may not exit the chamber efficiently thereby causing some or all of the foam to be retained in the brewing device rather than being delivered to the beverage delivery container (e.g., a coffee mug).

Thus, wherein the foaming component consists of only one foaming agent, such foaming agent is preferably physically associated with a coating agent. Wherein the foaming component consists of two foaming agents, either one or both of the foaming agents is preferably physically associated with a coating agent. The number of foaming agents which are physically associated with a coating agent is typically directed by the preference to prevent or minimize foaming until after the aqueous brewing fluid, and extracts obtained thereby, exit the ingredient extraction chamber and enter a containing device (e.g., a coffee mug). This way, the creation of foam is minimized within the ingredient extraction chamber, which alleviates any problems associated with transfer of the foam from the chamber to the containing device. For example, wherein the foaming component is a mixture of edible acids and edible bases, physically associating the edible acids will prevent, or minimize, the reaction of the edible bases until enough time has elapsed for the aqueous brewing fluid to solubilize the coating agent (which, pursuant to the present invention, will typically occur upon entry to the containing device). Thus, it is not necessary (but often may be desirable for further delay of foaming) that both the edible acids and the edible bases are physically associated with a coating agent.

Thus, the coating agent may be any agent with aids to delay or minimize creation of the foam until the brewed beverage exits the beverage brewing device. For example, wherein the aqueous liquid enters the chamber containing the coated edible acid and edible base, the aqueous liquid must first dissolve the coating agent prior to exposure of, and reaction between, the edible acid and base. Therefore, such exposure and reaction is delayed and primarily occurs subsequent to exiting the chamber. In such case, the majority of the foam is actually generated in the (e.g., the coffee mug) rather than in the brewing chamber.

Preferred coating agents are starches. Non-limiting examples of starches include pregelatinized starch (e.g., corn, wheat, tapioca), pregelatinized high amylose content starch, pregelatinized hydrolyzed starch, (e.g., maltodextrins, corn syrup solids), chemically modified starches such as pregelatinized substituted starches (e.g., octenyl succinate modified starches such as N-Creamer, N-Lite LP, and TEXTRA), as well as mixtures of these starches.

As with the above embodiments, it is important to understand that ingredient extraction chambers described in this embodiment of the present invention may contain one or more further ingredients for further optimized customization including (for example) creamers, sweeteners, flavorings, thickening agents, edible carriers, dyes, buffers, emulsifiers, processing aids, or mixtures thereof. One or more of these further ingredients may be contained within an ingredient extraction chamber containing, or devoid of, the first and second components of this third embodiment.

Also preferably in this embodiment, wherein the composition comprises one or more edible acids as part or all of the foaming agent, the composition contained within the ingredient extraction chamber contains from about 0.001% to about 15% of the total edible acid, and more preferably from about 1% to about 12% of the total edible acid, all by weight of the composition. Wherein the composition comprises edible base as part or all of the foaming agent, the composition contained within the ingredient extraction chamber contains from about 0.001% to about 20% of the total edible base, and more preferably from about 1% to about 12% of the total edible base, all by weight of the composition. Wherein the composition comprises one or more foaming creamers as part or all of the foaming agent, the composition contained within the ingredient extraction chamber contains from about 0.001% to about 50% of the total foaming creamer, more preferably from about 1% to about 25% of the total foaming creamer, and most preferably from about 5% to about 15% of the total foaming creamer, all by weight of the composition.

Proteinaceous Foam Stabilizers: One or more proteinaceous foam stabilizers may be utilized to preserve the foam wherein a foaming agent is used, or wherein foam is mechanically supplied to the final brewed beverage. The use of a proteinaceous foam stabilizer is particularly preferred for use herein. Non-limiting examples of suitable foam stabilizers include egg white albumin (ovalbumin), whey protein, soy protein, soy protein isolate, corn protein isolate, as well as mixtures of these stabilizers. Dried egg white albumin is particularly preferred because of its ability to form better and more stable foams at relatively low concentrations. The other proteinaceous foam stabilizers (e.g., whey protein) are typically effective only at much higher concentrations than egg white albumin.

These foam stabilizers decrease the surface tension so as to form continuous films due to complex intermolecular interactions to prevent rupture of the foam bubbles. Without intending to be limited by theory, the foam stabilizer acts as a macromolecular surfactant that provides multiple "anchor" or contact points at the air-water interface of the foam bubbles that are generated when the products of the present invention are mixed with water to form the beverage. Proteins with rapid adsorption and unfolding at the air-water interface produce better foams than proteins that adsorb slowly and resist unfolding at the interface. Unfolding and the ability to form thicker and more cohesive films depends on the elasticity of the protein which is further related to the flexibility of the protein in the adsorbed layer, i.e., proteins that exhibit high elasticity have very low flexibility. The greater stability of foams where egg white is used is due to the high concentration of rigid globular proteins present that have higher flexibility (i.e., caused by disulfide bonds in protein). Egg white typically has at least 40 different globular glycoproteins with ovalbumin accounting for usually about 54% of these glycoproteins.

Preferably, wherein a given composition contains one or more foam stabilizers, the composition comprises from about 0.1% to about 60% of the total foam stabilizer, more preferably from about 0.5% to about 40% of the total foam stabilizer, and most preferably from about 0.1% to about 10% of the total foam stabilizer.

Buffers: One or more buffers may also be utilized herein. Preferably, stabilizing salts are utilized to improve the colloidal solubility of proteins and maintain the pH on the finished beverage product of from about 6.2 to about 7 for optimum stability and flavor. The disodium or dipotassium salts of citric acid or phosphoric acid are most commonly used. The use of phosphate salts is particularly desirable when the water used for the preparation of the beverage is high in calcium or magnesium.

Emulsifiers: Emulsifiers are useful for dispersing fat in the beverage products of the present invention. Any food grade emulsifier suitable for inclusion in edible products can be used. Such emulsifiers are commonly known in the art.

Non-limiting examples of suitable emulsifiers include mono-glycerides and di-glycerides of long chain fatty acids, preferably saturated fatty acids, sucrose monoesters, sorbitan esters, polyethoxylated glycerols, and most preferably, stearic and palmitic acid mono-glycerides and di-glycerides. Propylene glycol esters are also useful. Lecithin is a particularly preferred emulsifier for use herein. Other examples of suitable emulsifiers are lactylated mono- and di-glycerides, propylene glycol monoesters, polyglycerol esters, diacetylated tartaric acid esters of mono- and di-glycerides, citric acid esters of monoglycerides, stearoyl-2-lactylates, polysorbates, succinylated monoglycerides, acetylated monoglycerides, and ethoxylated monoglycerides.

For example, suitable commercial emulsifiers include DIMODAN O, DIMODAN PV, and PANODAN FDP, all commercially available from Danisco Food Ingredients. The emulsifiers may be utilized with a co-emulsifier. Depending on the particular formulation chosen, suitable co-emulsifiers may be chosen from any food compatible co-emulsifier or emulsifier. Particularly preferred emulsifier/co-emulsifier systems include DIMODAN O, DIMODAN PV, and PANODAN FDP.

Preferably, wherein a composition comprises one or more emulsifiers, the composition comprises from about 0.001% to about 10% of the total emulsifier, more preferably from about 0.1% to about 5% of the total emulsifier, and most preferably from about 0.1% to about 3% of the total emulsifier, all by weight of the composition.

Processing Aids: One or more processing aids may be utilized herein. Non-limiting examples of processing aids include flow aids, anti-caking agents, dispersing aids, and the like. Particularly preferred are flow aids such as silicon dioxide and silica aluminates. Starches, aside from the thickening agents, can also be included to keep the various ingredients from caking.

Methods of Making the Compositions and Components Herein

The compositions and components herein may be prepared using standard methods known in the art. As an example, a preferred method for preparing the compositions and components herein includes dry blending the various ingredients together using a paddle mixer, drum mixer, screw mixer, plough-type mixer, or the like. The various compositions and components may be added to a given ingredient extraction chamber, as appropriate.

Methods of Measuring Mean Particle Sizes and Particle Size Distribution

The mean particle sizes and particle size distributions of various ingredients herein are measuring using a laser scattering system. A Horiba LA-900 laser scattering particle size distribution analyzer (Horiba, Calif.) is utilized. Number distribution is used to measure the number of particles of a given particle size. As used herein, wherein a particular ingredient has a given particle size distribution, it is meant that at least about 80% of the particles of that particular ingredient are, by weight, within the stated particle size distribution.

EXAMPLES

The following are non-limiting examples of beverage brewing devices used in accordance with the present invention. The following examples are provided to illustrate the invention and are not intended to limit the spirit or scope thereof in any manner.

Example 1

A beverage brewing device having one ingredient extraction chamber is utilized in a beverage brewing system. The beverage brewing device contains the following composition, which comprises roast ground coffee and instant coffee at a ratio of about 6.5:1, by weight.

| Ingredient | Amount (wt %) |
| --- | --- |
| SIMPLESSE 100 (CP Kelco, San Diego, CA) | 7.56 |
| Tapioca | 4.43 |
| KERRYKREME 220 Non-dairy creamer (Kerry Ingredients, Beliot WI) | 14.1 |
| 50% Coconut oil creamer with milk flavor (Dean Foods, Franklin Park, IL) | 13.5 |
| Sucrose | 12.1 |
| DP385 Foaming Creamer (DMV USA, Onalaska WI) | 12.1 |
| Dipotassium phosphate | 1.6 |
| IFF Steamed Milk Flavor #SNO32096 (International Flavors And Fragrences, New Jersey) | 0.21 |
| Acesulfame Potassium | 0.17 |
| Silicon Dioxide | 0.99 |
| 80% Milk Protein Concentrate (Erie Foods International, Erie, IL) | 1.5 |
| Instant Coffee (Freeze-dried Iguacu 192C) (Iguacu De Cafe Soluvel Cornillio Probcopio Brazil) | 4.2 |
| Roast and Ground Coffee | quantum satis (about 27.54) |

The composition used in this Example 1 is prepared by first agglomerating the Simplesse, tapioca starch and creamers and then sizing the agglomerates thru a 16 Mesh screen. The agglomerates are then combined with the remaining ingredients in a ribbon blender. The product is blended in a 5 cubic foot ribbon blender for 7 minutes at 48 RPM.

Approximately 24 grams of the composition is contained within one extraction chamber of a beverage brewing device according to the present invention. The beverage brewing device of this example is utilized to brew a foamed coffee beverage over a 60 second time period. During the brewing process, the indicated amount of instant coffee and creamer results in optimal fluidization within the ingredient extraction chamber upon introduction of hot water. As a result, the final brewed beverage exhibits café quality flavor.

Example 2

A beverage brewing device having one ingredient extraction chamber is utilized in a beverage brewing system. The beverage brewing device contains the following composition, which comprises roast ground coffee and instant coffee at a ratio of about 6.5:1, by weight.

| Ingredient | Amount (wt %) |
| --- | --- |
| SIMPLESSE 100 (CP Kelco, San Diego, CA) | 10.5 |
| Tapioca | 6.1 |
| KERRYKREME 220 Non-dairy creamer (Kerry Ingredients Beliot, WI) | 19.5 |
| 50% Coconut oil creamer with milk (Dean Foods Franklin Park, IL) | 13.6 |
| Sucrose | 13.1 |
| Dipotassium phosphate | 1.6 |
| IFF Steamed Milk Flavor #SNO32096 (International Flavors and Fragrances, New Jersey) | 0.21 |
| Acesulfame Potassium | 0.17 |
| Silicon Dioxide | 0.99 |
| 80% Milk Protein Concentrate (Erie Foods International, Erie, IL) | 1.98 |
| Whey Protein Concentrate | 0.5 |
| Instant Coffee (Freeze-dried Iguacu 192C) (Iguacu De Cafe Soluvel Cornillio Probcopio Brazil) | 4.2 |
| Roast and Ground Coffee | quantum satis (about 27.55) |

The composition used in this Example 2 is prepared by First agglomerating the simplesse, tapioca starch and creamers and then sizing the agglomerates thru a 16 Mesh screen. The agglomerates are then combined with the remaining ingredients in a ribbon blender. The product is blended in a 5 cubic foot ribbon blender for 7 minutes at 48 RPM.

Approximately 22 grams of the composition is contained within one extraction chamber of a beverage brewing device according to the present invention. The beverage brewing device of this example is utilized to brew a coffee beverage over a 60 second time period. During the brewing process, the indicated amount of instant coffee and creamer results in optimal fluidization within the ingredient extraction chamber upon introduction of hot water. As a result, the final brewed beverage exhibits café quality flavor.

Example 3

A beverage brewing device having one ingredient extraction chamber is utilized in a beverage brewing system. The beverage brewing device contains the following composition, which comprises roast ground coffee and instant coffee at a ratio of about 4.4:1, by weight and comprises citric acid which is physically associated with a coating agent.

| Ingredient | Amount (wt %) |
| --- | --- |
| 50% Coconut oil creamer (Dean Foods Franklin Park, IL) | 31.7 |
| Citric Acid coated with CAPSURE (Balchem Corp, Slate Hill, New York) | 4 |
| Sodium Bicarbonate | 7 |
| Sucrose | 22 |
| 80% Milk Protein Concentrate (Erie Foods International, Erie IL) | 4 |
| DP 385 Foaming Creamer (DMV USA, Onalaska WI) | 4 |
| Acesulfame Potassium | 0.3 |
| Freeze-dried Instant Coffee | 5 |
| Roast and Ground Coffee | 22 |

The composition used in Example 3 is prepared by mixing the ingredients in a 5 cubic foot ribbon blender for 7 minutes at 48 rpm. Approximately 25 grams of the composition is contained within one extraction chamber of a beverage brewing device according to the present invention.

The beverage brewing device of this example is utilized to brew a coffee beverage over a 60 second time period. During the brewing process, the indicated amount of instant coffee and creamer results in optimal fluidization within the ingredient extraction chamber upon introduction of hot water. A minimal amount of foam is retained in the ingredient extraction chamber. Foam is generated in, or on, the surface of the beverage as the beverage enters a coffee cup. As a result, the final brewed beverage exhibits café quality flavor and appearance.

Example 4

A beverage brewing device having one ingredient extraction chamber is utilized in a beverage brewing system. The beverage brewing device contains the following composition, which comprises roast ground coffee and a foaming component.

| Ingredient | Amount (wt %) |
| --- | --- |
| KERRYKREME 220 Non-Dairy creamer (Kerry Ingredients Beliot, WI) | 27.5 |
| Citric Acid | 5.6 |
| Sodium Bicarbonate | 7.3 |
| Sucrose | 17.6 |
| SIMPLESSE 100 (CP Kelco, San Diego, CA) | 1.4 |
| DP 385 Foaming Creamer (DMV USA, Onalaska WI) | 7.0 |
| Acesulfame Potassium | 0.07 |
| Irish Cream flavor | 0.42 |
| Dried egg white | 2.1 |
| White chocolate granule | 1.4 |
| Roast and Ground Coffee | quantum satis (about 29.6) |

The composition used in this Example 4 is prepared by mixing the ingredients in a 5 cubic foot ribbon blender for 7 minutes at 48 rpm. Approximately 40 grams of the composition is contained within one extraction chamber of a beverage brewing device according to the present invention.

The beverage brewing device of this example is utilized to brew a foamed coffee beverage over a 60 second time period. A minimal amount of foam is retained in the ingredient extraction chamber.

Example 5

A beverage brewing device having one ingredient extraction chamber is utilized in a beverage brewing system. The beverage brewing device contains the following composition, which comprises roast ground coffee as the first component, a mixture of instant coffee and cocoa as the second component, a third component comprising creamer, sweetener, flavoring agent, wherein the ratio of the first component to the second component is about 1:1, by weight.

| Ingredient | Amount (wt %) |
| --- | --- |
| SIMPLESSE 100 (CP Kelco, San Diego, CA) | 8.7 |
| Tapioca (Modified Food Starch) | 5.1 |
| KERRYKREME 220 Non-dairy creamer (Kerry Ingredients Beliot, WI) | 16.2 |
| 50% Coconut oil creamer with milk flavor (Dean Foods Franklin Park, IL) | 20 |
| Sucrose | 17.3 |
| Dipotassium phosphate | 1 |
| Cocoa (from about 16% to about 18% fat) | 5 |
| Acesulfame Potassium | 0.32 |
| Silicon Dioxide | 1 |
| Freeze Dried Instant Coffee | 10 |
| Roast and Ground Coffee | quantum satis (about 15.4) |

The composition used in this Example 5 is prepared by First agglomerating the simplesse, tapioca starch and creamers and then sizing the agglomerates thru a 16 Mesh screen. The agglomerates are then combined with the remaining ingredients in a ribbon blender. The product is blended in a 5 cubic foot ribbon blender for 7 minutes at 48 RPM. Approximately 35 grams of the composition is contained within one extraction chamber of a beverage brewing device according to the present invention.

The beverage brewing device of this example is utilized to brew a coffee beverage over a 60 second time period. During the brewing process, the indicated amount of instant coffee, creamer, sweetener, and flavoring agent results in optimal fluidization within the ingredient extraction chamber upon introduction of hot water. As a result, the final brewed beverage exhibits café quality flavor.

Example 6

A beverage brewing device having one ingredient extraction chamber is utilized in a beverage brewing system. The beverage brewing device contains the following composition.

| Ingredient | Amount (wt %) |
| --- | --- |
| SIMPLESSE 100 (CP Kelco, San Diego, CA) | 9 |
| Tapioca (Modified Food Starch) | 5.3 |
| KERRYKREME 220 Non-dairy creamer (Kerry Ingredients Beliot, WI) | 16.7 |
| 50% Coconut oil creamer with milk flavor (Dean Foods Franklin Park, IL) | 22 |
| Sucrose | 17.3 |
| IFF Steamed Milk Flavor No. SNO32096 (International Flavors and Fragrances, New Jersey) | 0.37 |

-continued

| Ingredient | Amount (wt %) |
|---|---|
| Dipotassium phosphate | 1 |
| M-700 Maltodextrin (low density, 0.1 g/mL) (Grain Processing Inc., Muscatine, IA) | 15 |
| Silicon dioxide | 1 |
| Acesulfame Potassium | 0.32 |
| Freeze Dried Instant Coffee | quantum satis (about 12) |

The composition used in Example 6 are prepared by first agglomerating the simplesse, tapioca starch and creamers and then sizing the agglomerates thru a 16 Mesh screen. The agglomerates are then combined with the remaining ingredients in a ribbon blender. The product is blended in a 5 cubic foot ribbon blender for 7 minutes at 48 RPM. Approximately 22 grams of the composition is contained within one extraction chamber of a beverage brewing device according to the present invention.

The beverage brewing device of this example is utilized to brew a coffee beverage over a 60 second time period. During the brewing process, the instant coffee and edible carrier results in optimal fluidization within the ingredient extraction chamber upon introduction of hot water. As a result, the final brewed beverage exhibits café quality flavor.

Having now described several embodiments of the present invention it should be clear to those skilled in the art that the forgoing is illustrative only and not limiting, having been presented only by way of exemplification. Numerous other embodiments and modifications are contemplated as falling within the scope of the present invention as defined by the appended claims thereto.

What is claimed is:

1. A beverage brewing device comprising one or more extraction chambers wherein at least one of the extraction chambers contains a composition comprising:
   a) a first component selected from the group consisting of roast ground coffee, leaf tea, and mixtures thereof;
   b) a second component selected from the group consisting of instant coffee, instant tea, cocoa, and mixtures thereof; and
   c) a third component selected from the group consisting of creamers, sweeteners, flavorings, thickening agents, edible carriers, dyes, foaming agents, buffers, emulsifiers, processing aids, and mixtures thereof;
   wherein the ratio of the first component to the second component is from about 1:25 to about 25:1, by weight.

2. A beverage brewing device according to claim 1 wherein:
   a) the first component is roast ground coffee; and
   b) the second component is selected from the group consisting of instant coffee, cocoa, and mixtures thereof.

3. A beverage brewing device according to claim 2 wherein the second component comprises instant coffee.

4. A beverage brewing device according to claim 3 wherein the third component comprises one or more members selected from the group consisting of creamers, sweeteners, flavorings, thickening agents, edible carriers, foaming agents, buffers, emulsifiers, processing aids, and mixtures thereof.

5. A beverage brewing device according to claim 4 wherein the third component comprises one or more members selected from creamers, sweeteners, flavorings, and foaming agents.

6. A beverage brewing device according to claim 5 wherein the third component comprises one or more creamers having a mean particle size of from about 200 microns to about 300 microns.

7. A beverage brewing device according to claim 6 wherein the third component comprises one or more creamers having a mean density of from about 0.3 g/mL to about 0.5 g/mL.

8. A beverage brewing device according to claim 7 wherein the roast ground coffee has a mean particle size of from about 750 microns to about 950 microns.

9. A beverage brewing device according to claim 8 wherein the instant coffee has a mean particle size of from about 700 microns to about 900 microns.

10. A beverage brewing device according to claim 9 wherein the composition comprises from about 20% to about 35% of the roast ground coffee and from about 1% to about 15% of the instant coffee, all by weight of the composition.

11. A beverage brewing device according to claim 10 wherein the composition comprises from about 40% to about 60% of total creamer, by weight of the composition.

12. A beverage brewing device according to claim 11 wherein the second component is a mixture of the instant coffee and cocoa.

13. A beverage brewing device according to claim 11 wherein the third component comprises the creamer and sweetener, wherein the sweetener comprises a member selected from sucrose, acesulfame, and mixtures thereof.

14. A beverage brewing device comprising one or more extraction chambers wherein at least one of the extraction chambers comprises a composition comprising:
   a) a first component selected from the group consisting of roast ground coffee, leaf tea, instant coffee, instant tea, cocoa, and mixtures thereof; and
   b) a second component which comprises three or more members selected from the group consisting of creamers, sweeteners, flavorings, thickening agents, edible carriers, dyes, foaming agents, buffers, emulsifiers, and processing aids.

15. A beverage brewing device according to claim 14 wherein the first component is selected from the group consisting of roast ground coffee, instant coffee, cocoa, and mixtures thereof.

16. A beverage brewing device according to claim 14 wherein the first component comprises roast ground coffee.

17. A beverage brewing device according to claim 14 wherein the first component comprises a mixture of roast ground coffee and instant coffee.

18. A beverage brewing device according to claim 17 wherein the second component comprises:
   a) from about 20% to about 70% of total creamer, by weight of the composition; and
   b) from about 5% to about 25% of total sweetener, by weight of the composition.

19. A beverage brewing device according to claim 17 wherein the second component comprises:
   a) from about 20% to about 70% of total creamer, by weight of the composition; and
   b) from about 5% to about 25% of total sweetener, by weight of the composition.

20. A beverage brewing device according to claim 14 wherein the first component is instant coffee.

21. A beverage brewing device according to claim 20 wherein the first component is a mixture of cocoa and instant coffee.

* * * * *